(12) United States Patent
Simpson et al.

(10) Patent No.: US 7,815,998 B2
(45) Date of Patent: Oct. 19, 2010

(54) CONDUCTIVE POLYMER FOAMS, METHOD OF MANUFACTURE, AND USES THEREOF

(75) Inventors: Scott Simpson, Woodstock, CT (US); Ki-Soo Kim, Katonah, NY (US); Jason Hoffman, Danielson, CT (US)

(73) Assignee: World Properties, Inc., Lincolnwood, IL (US)

( * ) Notice: Subject to any disclaimer, the term of this patent is extended or adjusted under 35 U.S.C. 154(b) by 290 days.

(21) Appl. No.: 12/027,018

(22) Filed: Feb. 6, 2008

(65) Prior Publication Data
US 2008/0213565 A1 Sep. 4, 2008

Related U.S. Application Data

(60) Provisional application No. 60/888,360, filed on Feb. 6, 2007.

(51) Int. Cl.
*B32B 5/22* (2006.01)
*H05B 6/00* (2006.01)
(52) U.S. Cl. .................. 428/317.9; 264/429; 427/547
(58) Field of Classification Search ............. 428/317.9; 439/91; 427/547; 264/429
See application file for complete search history.

(56) References Cited

U.S. PATENT DOCUMENTS

| | | | |
|---|---|---|---|
| 3,359,145 A | 12/1967 | Salyer et al. | |
| 3,523,988 A * | 8/1970 | Plasse et al. | ............ 264/41 |
| 3,548,862 A | 12/1970 | Nakamura et al. | |
| 4,113,981 A | 9/1978 | Fujita et al. | |
| 4,209,481 A | 6/1980 | Kashiro et al. | |
| 4,378,322 A | 3/1983 | Atterbury et al. | |
| 4,546,037 A | 10/1985 | King | |
| 4,548,862 A | 10/1985 | Hartman | |
| 4,602,310 A | 7/1986 | Fenster | |
| 4,643,499 A | 2/1987 | Mitchell | |
| 4,644,101 A | 2/1987 | Jin et al. | |

(Continued)

FOREIGN PATENT DOCUMENTS

WO     2006128741 A1    12/2006

(Continued)

OTHER PUBLICATIONS

Nusil Techonology, R-2350 Flame Retardant, RTV Silicone Foam Product Profile, Dec. 15, 2006, 2 pages.

(Continued)

*Primary Examiner*—Hai Vo
(74) *Attorney, Agent, or Firm*—Cantor Colburn LLP

(57) ABSTRACT

Articles are disclosed, comprising a polymer foam layer having a first surface and an opposite second surface; a plurality of cells between the first surface and the opposite second surface of the polymer foam layer, wherein the thickness of the polymer foam layer between the first surface and the opposite second surface is 1.0 to 1.5 times the average height of the plurality of cells; and a plurality of magnetic, electrically conductive particles aligned into a plurality of mutually isolated chains that essentially continuously span the foam between the first surface and the opposite second surface of the polymer foam layer. The foams are useful as gaskets for electromagnetic shielding, grounding pads, battery contact conductive spring elements, and the like.

28 Claims, 4 Drawing Sheets

U.S. PATENT DOCUMENTS

| | | | |
|---|---|---|---|
| 4,737,112 A | 4/1988 | Jin et al. |
| 4,769,166 A | 9/1988 | Harrison |
| 4,778,635 A | 10/1988 | Hechtman et al. |
| 4,793,814 A | 12/1988 | Zifcak et al. |
| 4,820,376 A | 4/1989 | Lambert et al. |
| 4,838,347 A | 6/1989 | Dentini et al. |
| 4,902,857 A | 2/1990 | Cranston et al. |
| 4,923,739 A | 5/1990 | Jin et al. |
| 4,960,612 A | 10/1990 | Dentini et al. |
| 5,045,249 A | 9/1991 | Jin et al. |
| 5,049,982 A | 9/1991 | Lee et al. |
| 5,095,337 A | 3/1992 | Yamaguchi |
| 5,132,058 A | 7/1992 | Suyama et al. |
| 5,152,937 A | 10/1992 | Tetu |
| 5,155,302 A | 10/1992 | Nguyen |
| 5,206,585 A | 4/1993 | Chang et al. |
| 5,240,761 A | 8/1993 | Calhoun et al. |
| 5,304,460 A | 4/1994 | Fulton et al. |
| 5,313,840 A | 5/1994 | Chen et al. |
| 5,317,255 A | 5/1994 | Suyama et al. |
| 5,334,029 A | 8/1994 | Akkapeddi et al. |
| 5,417,577 A | 5/1995 | Holliday et al. |
| 5,429,701 A | 7/1995 | Lu |
| 5,443,876 A | 8/1995 | Koskenmaki et al. |
| 5,509,815 A | 4/1996 | Jin et al. |
| 5,522,962 A | 6/1996 | Koskenmaki et al. |
| 5,591,037 A | 1/1997 | Jin et al. |
| 5,607,882 A | 3/1997 | Lambert et al. |
| 5,618,189 A | 4/1997 | Jin et al. |
| 5,733,322 A | 3/1998 | Starkenbaum |
| 5,769,998 A | 6/1998 | Tanzawa et al. |
| 5,795,162 A | 8/1998 | Lambert |
| 5,846,357 A | 12/1998 | Meteer et al. |
| 5,851,644 A | 12/1998 | McArdle et al. |
| 6,011,307 A | 1/2000 | Jiang et al. |
| 6,067,430 A | 5/2000 | Mammino et al. |
| 6,168,736 B1 | 1/2001 | Harrison et al. |
| 6,376,393 B1 | 4/2002 | Newton et al. |
| 6,410,846 B1 | 6/2002 | Benn, Jr. |
| 6,476,113 B1 | 11/2002 | Hiles |
| 6,574,114 B1 | 6/2003 | Brindle et al. |
| 6,613,267 B1 | 9/2003 | Konno |
| 6,613,976 B1 | 9/2003 | Benn, Jr. |
| 6,809,280 B2 | 10/2004 | Divigalpitiya et al. |
| 6,844,378 B1 | 1/2005 | Martin et al. |
| 6,854,985 B1 | 2/2005 | Weiss |
| 6,854,986 B2 | 2/2005 | Weiss |
| 6,915,701 B1 | 7/2005 | Tarler |
| 7,161,090 B2 | 1/2007 | Mattsson et al. |
| 2005/0286966 A1 | 12/2005 | Gueret |
| 2006/0269864 A1 | 11/2006 | Tarnawskyj |
| 2008/0311378 A1* | 12/2008 | Simpson ................ 428/319.1 |
| 2009/0226696 A1* | 9/2009 | Simpson ................ 428/304.4 |

FOREIGN PATENT DOCUMENTS

WO  2008074705 A1  6/2008

OTHER PUBLICATIONS

Catherine Gallagher, Goran Matijasevic, James F. Maguire, Transient Liquid Phase Sintering Conductive Adhesives as Solder Replacements, May 19-21, 1997, 7 pages.

International Search Report for International Application No. PCT/US2008/072240, mailed Apr. 13, 2009, 7 pages.

Written Opinion for International Search Report for International Application No. PCT/US2008/072240, mailed Apr. 13, 2009, 8 pages.

Shen, et al., Experimental Research and Modeling of Magnetorheological Elastomers, Journal of Intelligent Material Systems and Structures, Jan. 2004, pp. 27-35, vol. 15.

Jolly, et al., The Magnetoviscoelastic Response of Elastomer Composites Consisting of Ferrous Particles Embedded in a Polymer Matrix, Journal of Intelligent Material Systems and Structures, Nov. 1996, pp. 613-622, vol. 7.

Davis, L.C., Model of magnetorheological elastomers, Journal of Applied Physics, Mar. 15, 1999, pp. 3348-3351, vol. 85, No. 6.

Ginder, et al., Magnetorheological Elastomers: Properties and Applications, SPIE, Mar. 1999, pp. 131-138, vol. 3675.

WO 2008074705, published Jun. 26, 2006, Human Translation, 30 pages.

European Patent Office, International Search Report, International Application No. PCT/US2008/001564, Date of Mailing: May 29, 2008.

European Patent Office, PCT Written Opinion, International Application No. PCT/US2008/001564, Date of Mailing: May 29, 2008.

* cited by examiner

CONDUCTIVE POLYMER FOAMS, METHOD OF MANUFACTURE, AND USES THEREOF

CROSS-REFERENCE TO RELATED APPLICATION

This application claims the benefit of U.S. application Ser. No. 60/888,360, filed Feb. 6, 2007, which is incorporated by reference herein in its entirety.

BACKGROUND

This disclosure relates to electrically conductive polymers, and methods of manufacture thereof, as well as articles comprising the polymers.

Electrically conductive polymer foams are of utility in a wide variety of applications, including as electrical contacting devices, in sensors, and in applications requiring electromagnetic interference (EMI)/radio frequency interference (RFI) shielding and/or electrostatic dissipation. Current materials capable of EMI/RFI shielding include, for example, beryllium-copper finger stock, metal foil or metallized fabric wrapped around non-conductive foam gaskets, non-conductive gaskets coated with conductive materials, and metal-containing fillers loaded into silicone resins. Other electrically conductive foams are also known, for example certain polyurethanes and polyolefins. One difficulty with currently available methods and materials is that the addition of the high levels of conductive filler(s) sufficient to achieve high conductivity affects the compressibility and processability of the polymer. In addition, use of such high filler levels increases the cost of the polymer blend. Users are often forced to make a trade-off between the cost and the quality of the material.

It would be a further advantage to provide polymer foams where the amount of added filler is minimized, while maintaining a suitable electrical conductivity. It would be a further advantage that the compressibility, processability, and other physical properties of the foam that are desired for a particular application not be significantly adversely affected.

There accordingly remains a need in the art for compositions and methods whereby foams can be provided with both electrical conductivity and compressibility and processability, particularly without significant adverse effect on one or more physical properties desired for a particular application.

BRIEF SUMMARY

Disclosed herein is a polymer foam layer having a first surface and an opposite second surface; a plurality of cells between the first surface and the opposite second surface of the polymer foam layer, wherein the thickness of the polymer foam layer between the first surface and the opposite second surface is 1.0 to 1.5 times the average height of the plurality of cells; and a plurality of magnetic, electrically conductive particles aligned into a plurality of mutually isolated chains that essentially continuously span the foam between the first surface and the opposite second surface of the polymer foam layer.

Articles are also disclosed, comprising the above-described a polymer foam layer.

In another embodiment, a method of manufacturing a polymer foam layer comprises forming a layer having a first surface and an opposite second surface, the layer comprising a polymer foam precursor composition; and a filler composition comprising a plurality of magnetic, electrically conductive particles, and foaming the foam precursor composition to form a plurality of cells in the layer; applying to the layer a magnetic field of a strength and for a time effective to align the magnetic, electrically conductive particles into a plurality of mutually isolated chains between the first surface and the opposite second surface of the layer; and curing the foamed layer, wherein the thickness of the cured layer is 1.0 to 1.5 times the average height of the plurality of cells in the cured layer.

The foams, articles, and methods of manufacture thereof are further described in the following drawings, detailed description, and examples.

DETAILED DESCRIPTION

Figure 1:
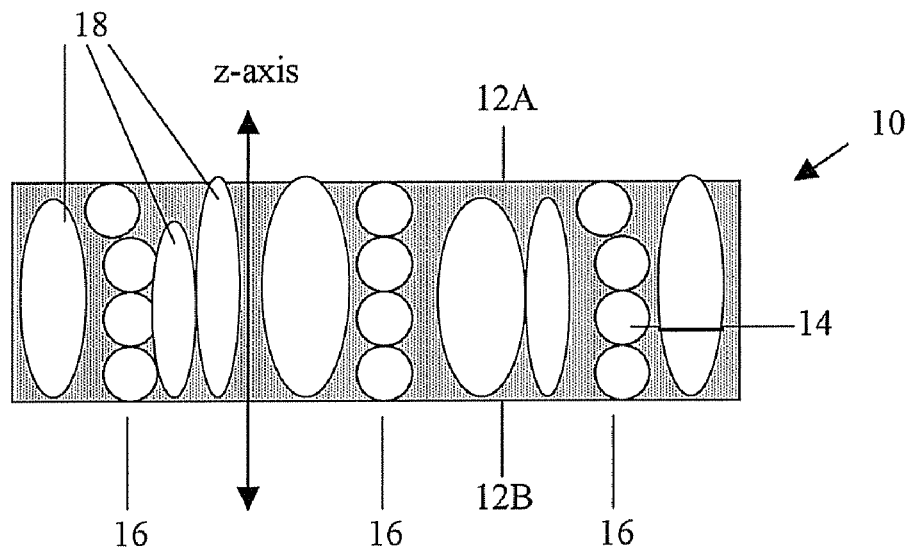
FIG. 1 is a schematic diagram of an exemplary electrically conductive polymer foam.

The inventors hereof have unexpectedly found that it is possible, in polymer foams, to magnetically align electrically conductive particles into columns within the foams to provide electrical conductivity to the polymer foams. While such magnetic alignment has been demonstrated in solid polymers, it is unexpected that this technique can also be used to provide electrical conductivity to cellular polymers. It has been found that improved conductivity is achieved when the average height of the cells in the foam approximates that of the thickness of the foam layer, i.e., when thickness of the foam layer is 1.0 to 1.5 times the average height of the cells in the foam. In a further unexpected feature, such electrical conductivity can be achieved without significantly adversely affecting the physical properties of the polymer foams. Thus, in one embodiment, polymer foams are produced that are electrically conductive, and that also substantially retain one or more of their compressibility, flexibility, compression set resistance, cell uniformity, and the like. These materials are particularly suitable for use in the formation of articles that can provide shielding from EMI and/or RFI.

The electrically conductive particles comprise both an electrically conductive material and a magnetic material, which can be the same or different material. Exemplary electrically conductive materials include conductive metals such as gold, silver, nickel, copper, aluminum, chromium, cobalt, iron, and the like, as well as oxides or alloys comprising at least one of the foregoing metals. Suitable magnetic materials include ferromagnetic and paramagnetic materials. Exemplary magnetic materials include iron, nickel, and cobalt, as well as the lanthanide rare earth elements, and the like, and oxides, ceramics, and alloys of at least one of the foregoing magnetic materials. In one embodiment, the magnetic, electrically conductive material is also a non-oxidizing material.

The particles can be wholly formed from the magnetic, electrically conductive material(s), or the magnetic, electrically conductive material(s) can be used as a core or a coating, together with a non-magnetic material, a non-electrically conductive material, or non-magnetic, non-electrically conductive material. For example, an electrically conductive material could be used to coat a core comprising a magnetic material such as an iron particle, or a magnetic and electrically conductive material could be used to coat a non-magnetic, non-electrically conductive material such as glass, including glass microballoons. Silver and nickel coatings are especially useful. Specific magnetic, electrically conductive particles include silver particles, silver-coated nickel particles, silver-coated iron particles, nickel particles, and nickel-coated particles such as nickel-coated aluminum trihydroxide ($Al(OH)_3$, "ATH"), and nickel-coated glass particles.

The electrically conductive, or magnetic and electrically conductive material can be deposited on the core particles by coating techniques such as vapor deposition, electroless plating, and the like. In one embodiment, an electroless plating process can be used to deposit nickel onto aluminum trihydroxide. In another embodiment, vapor deposition of nickel carbonyl is used to provide a nickel coating. A sufficient amount of electrically conductive material is coated onto the magnetically conductive particles such that the particles, when used to form composites, impart the desired level of conductivity to the composite, without significantly adversely affecting the desired properties of the polymer. It is not necessary for all of the particles to be coated, or for the coating to completely cover each particle. Particles that are at least substantially coated can therefore be used. For example, in a given batch of particles, at least about 60% of the total surface area of the particles is coated, specifically at least about 70%, more specifically at least about 80%, and even more specifically at least about 90% of the total surface area of the particles is coated. Coating thickness can vary widely. In one embodiment, the thickness of the coating is about 0.004 to about 0.2 mils (about 0.1 to about 5 micrometers), specifically about 0.02 to about 0.1 mils (about 0.526 to about 3 micrometers).

The particles can have a variety of irregular or regular shapes, e.g., spherical, flake, plate- or rod-like. Particles having a combination of different shapes can be used. Spherical or rod-like shapes are preferred. The particle size is not particularly limited, and can have, for example, an average largest dimension of about 0.250 to about 500 micrometers. Specifically, the average largest dimension of the particles can be about 1 to about 250 micrometers, more specifically, about 5 to about 200 micrometers. This average size can be achieved with single filler, or a mixture of fillers having various average particle sizes. Thus, the particle size distribution of the filler can be bimodal, trimodal, or more. In one embodiment, the particles are spherical, and have an average diameter in the range of about 20 to about 300 micrometers, specifically about 50 to about 200 micrometers, more specifically about 75 to about 100 micrometers. In another embodiment, the particles are spherical, and have a bimodal particle size distribution, for example one mode having an average diameter of in the range from about 20 to about 150 micrometers, and a second mode having an average diameter in the range from about 150 to about 300 micrometers.

Other electrically conductive fillers can additionally be used to attain a desired conductivity, such as carbon black, carbon fibers such as PAN fibers, metal-coated fibers or spheres such as metal-coated glass fibers, metal-coated carbon fibers, metal-coated organic fibers, metal coated ceramic spheres, metal coated glass beads and the like, inherently conductive polymers such as polyaniline, polypyrrole, polythiophene in particulate or fibril form, conductive metal oxides such as tin oxide or indium tin oxide, and combinations comprising at least one of the foregoing conductive fillers can also be used. The relative ratio of magnetic, electrically conductive filler to electrically conductive filler can vary widely, depending on the types of filler used and the desired properties of the foam. In general, the filler composition can comprise 50 to 100 weight percent (wt %) magnetic, electrically conductive material and 0 to 50 wt % electrically conductive filler, more specifically 75 to 99 wt. % magnetic, electrically conductive filler and 1 to 25 wt % electrically conductive filler, each based on the total weight of the filler composition.

The relative amount of the filler composition used in the manufacture of the electrically conductive polymer foam will vary depending on the type of polymer, the type of particles, the intended use, the desired electrical conductivity, foam cell structure, processing characteristics, and similar factors. In one embodiment, the electrically conductive polymer foam comprises a total filler content about 10 to about 90 wt %, specifically about 20 to about 80 wt %, even more specifically, about 30 to about 70 wt %, each based on the total weight of the electrically conductive polymer foam. Alternatively, the amount of filler can be described as a percent of the volume (vol %) of the precursor formulation for the electrically conductive polymer foam prior to foaming. In one embodiment, the foam comprises about 1 to about 30 vol % filler particles, specifically about 2 to about 20 vol %, more specifically about 3 to about 15 vol % of the polymer foam precursor formulation prior to foaming.

As used herein, a "foam" is a material having a cellular structure and a density of about 5 to about 150 pounds per cubic foot (pcf) (80 to 2402 kilogram per cubic meter (kcm)), specifically less than or equal to about 125 pcf (2002 kcm), more specifically less than or equal to about 100 pcf (1601 kcm), and still more specifically about 10 to about 60 pcf (160 to 961 kcm). Such foams have a void content of about 20 to about 99%, specifically greater than or equal to about 30%, and more specifically greater than or equal to about 50%, each based upon the total volume of the foam.

Polymers for use in the foams can be selected from a wide variety of thermoplastic resins, blends of thermoplastic resins, or thermosetting resins. Examples of thermoplastic resins that can be used include polyacetals, polyacrylics, styrene acrylonitrile, polyolefins, acrylonitrile-butadiene-styrene, polycarbonates, polystyrenes, polyethylene terephthalates, polybutylene terephthalates, polyamides such as, but not limited to Nylon 6, Nylon 6,6, Nylon 6,10, Nylon 6,12, Nylon 11 or Nylon 12, polyamideimides, polyarylates, polyurethanes, ethylene propylene rubbers (EPR), polyarylsulfones, polyethersulfones, polyphenylene sulfides, polyvinyl chlorides, polysulfones, polyetherimides, polytetrafluoroethylenes, fluorinated ethylene propylenes, polychlorotrifluoroethylenes, polyvinylidene fluorides, polyvinyl fluorides, polyetherketones, polyether etherketones, polyether ketone ketones, and the like, or a combination comprising at least one of the foregoing thermoplastic resins.

Examples of blends of thermoplastic resins that can be used in the polymer foams include acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, polysulfone/acrylonitrile-butadiene-styrene, polycarbonate/thermoplastic urethane, polycarbonate/polyethylene terephthalate, polycarbonate/polybutylene terephthalate, thermoplastic elastomer alloys, polyethylene terephthalate/ polybutylene terephthalate, styrene-maleic anhydride/acrylonitrile-butadiene-styrene, polyether etherketone/polyethersulfone, styrene-butadiene rubber, polyethylene/nylon, polyethylene/polyacetal, ethylene propylene rubber (EPR), and the like, or a combination comprising at least one of the foregoing blends.

Examples of polymeric thermosetting resins that can be used in the polymer foams include polyurethanes, epoxys, phenolics, polyesters, polyamides, silicones, and the like, or a combination comprising at least one of the foregoing thermosetting resins. Blends of thermosetting resins as well as blends of thermoplastic resins with thermosetting resins can be used.

Other additives known for use in the manufacture of foams can be present in the foam compositions, for example other fillers, such as reinforcing fillers such as woven webs, silica, glass particles, and glass microballoons, fillers used to provide thermal management, or flame retardant fillers or additives. Suitable flame retardants include, for example, a metal hydroxide containing aluminum, magnesium, zinc, boron, calcium, nickel, cobalt, tin, molybdenum, copper, iron, titanium, or a combination thereof, for example aluminum trihydroxide, magnesium hydroxide, calcium hydroxide, iron hydroxide, and the like; a metal oxide such as antimony oxide, antimony trioxide, antimony pentoxide, iron oxide, titanium oxide, manganese oxide, magnesium oxide, zirconium oxide, zinc oxide, molybdenum oxide, cobalt oxide, bismuth oxide, chromium oxide, tin oxide, nickel oxide, copper oxide, tungsten oxide, and the like; metal borates such as zinc borate, zinc metaborate, barium metaborate, and the like; metal carbonates such as zinc carbonate, magnesium carbonate, calcium carbonate, barium carbonate, and the like; melamine cyanurate, melamine phosphate, and the like; carbon black, expandable graphite flakes (for example those available from GrafTech International, Ltd. under the tradename GRAFGUARD), and the like; nanoclays; and brominated compounds. Exemplary flame retardant materials are magnesium hydroxides, nanoclays, and brominated compounds. In one embodiment, flame retardance of the polymer foam meets certain Underwriter's Laboratories (UL) standards for flame retardance. For example, the polymer foam has a rating of V-0 under UL Standard 94.

Still other additives that can be present include dyes, pigments (for example titanium dioxide and iron oxide), antioxidants, antiozonants, ultraviolet (UV) stabilizers, conductive fillers, catalysts for cure of the polymer, crosslinking agents, and the like, as well as combinations comprising at least one of the foregoing additives.

In a general process for producing the electrically conductive foams, the polymer composition used to form the foam is combined with the magnetic, electrically conductive filler composition (and any other optional additives), and used to form a layer having a first side and an opposite second side that is then exposed to a magnetic field. Depending on the polymer, foaming can be performed prior to casting; during casting; after casting and before exposure to the magnetic field; or after casting and during exposure to the magnetic field. The layer is exposed to a magnetic field at a strength and for a time effective to substantially align the magnetic, electrically conductive particles in isolated columns extending from a first surface of the layer to an opposite, second surface. The foam can be left uncured during exposure to the magnetic field, it can be partially cured prior to exposure to the magnetic field; it can be partially cured during exposure to the magnetic field; it can be fully cured during exposure to the magnetic field; or it can be fully cured following exposure to the magnetic field. In one embodiment, the foam is partially cured prior to exposure to the magnetic field, and fully cured during exposure to the magnetic field. In another embodiment, the foam is partially cured prior to or during exposure to the magnetic field, and fully cured after exposure to the magnetic field.

Magnetic field strengths suitable for particle alignment depend on a variety of factors, including the viscosity of the foam, foam thickness, and density, and the nature of the particle. In one embodiment, a higher field strength is advantageous for thinner foams. In one embodiment, the magnetic field strength has a magnetic flux density of about 50 to about 2000 Gauss, specifically, about 100 to about 1500 Gauss, and more specifically about 125 to about 1200 Gauss.

In one embodiment, the magnetic field is aligned with the layer such that the magnetic electrically conductive particles are organized into columns that are perpendicular to the x and y axis of the foam, that is, aligned along the z-axis, as a result of application of a magnetic field perpendicular to the first and second surfaces of the layer. FIG. 1 shows a schematic diagram of a cross-section of an electrically conductive polymer foam 10. The electrically conductive polymer foam 10 comprises a polymer foam 12 having a first surface 12a and a second surface 12b, and magnetic, electrically conductive particles 14. The magnetic, electrically conductive particles 14 are organized into columns 16 that align with the magnetic field along the z-axis of the electrically conductive polymer foam 10, that is, perpendicular to first and second surfaces 12a, 12b. The magnetic, electrically conductive particles 14 may organize into columns 16 of different forms, but the columns 16 of different forms are substantially aligned with the magnetic field. The thickness of the foam along the z-axis is 1.0 to 1.5 times that of the average height of cells 18.

In another embodiment, the magnetic, electrically conductive particles are organized into columns that are aligned on an incline relative to the z-axis as a result of application of a magnetic field at an angle of incline relative to the z-direction of desired conductivity transverse to the x-y plane of the polymer foam. In one embodiment, the angle of the incline ($\theta$) is about 1° to about 45° relative to either side of the z-axis, specifically about 5° to about 30°, and more specifically about 10° to about 20° relative to either side of the z-axis. Without being bound by theory, a foam comprising columns aligned on an incline relative to the z-axis may be more compressible and the columns less likely to be damaged or destroyed as the columns may deflect more easily in the direction of the compression force.

In one embodiment, the surfaces of the polymer foam are substantially flat. A smooth surface provides improved sealing in gasketing applications. In a specific embodiment each surface of the foam is substantially free of protrusions or indentations that arise from the presence of the aligned filler particles. More specifically, the x and y surfaces of the foam are substantially free of protrusions or indentations that arise from alignment of the filler particles and that alter the surface of the x and y surfaces.

Advantageously, the layer is formed by casting the foam or foamable composition onto a carrier substrate. Thus, a first carrier substrate is provided, and the layer having a first surface and an opposite second surface, is disposed on the substrate, wherein the first surface is in contact with the substrate. It is further advantageous to dispose a second (top) carrier substrate onto the second surface of the layer. Foaming the layer and/or applying the magnetic field can be effected before or after disposing the second carrier substrate. In one embodiment, the layer is foamed prior to disposing the second carrier substrate. In another embodiment, the layer is foamed after disposing the second carrier substrate. In yet another embodiment, the magnetic field is applied to the layer after disposing the second carrier substrate. Use of a top carrier provides improved quality foams.

In practice, the carriers can be played out from supply rolls and ultimately rewound on take-up rolls upon separation from the cured foam. The selection of materials for the top and bottom carriers will depend on factors such as the desired degree of support and flexibility, the desired degree of releasability from the cured foam, cost, and the like considerations. Paper, thin sheets of metal such as copper or aluminum, or polymer films such as polyethylene terephthalate, silicone, polycarbonate, PTFE, polyimide, or the like can be used. The material can be coated with a release coating.

In one embodiment, the carrier is coated with a material intended to be transferred to the surface of the cured foam, for example a polyurethane film that is releasable from the carrier, a pressure sensitive adhesive that is releasable from the carrier, or a conductive adhesive that is releasable from the carrier. A fibrous web or other filler material can be disposed on the surface of the carrier, and thereby become ultimately incorporated into the cured foam. In another embodiment, the foam cures to one or both of the carriers. Thus, one or both carriers form part of the final product, instead of being separated from the foam and being rewound on a take-up roll. For example, the foam can be cast onto a conductive layer such as a copper foil. In a specific embodiment, the copper foil further comprises an elastomer layer comprising conductive particles. The foam is cast onto this elastomer layer to provide an article comprising the conductive layer and the foam, with the elastomer/particle layer disposed therebetween. Alternatively, a conveyor belt can be used as the bottom carrier.

The carriers can have a smooth surface or a textured, e.g., matte surface. In a specific embodiment, the carriers have a smooth surface. An electrically conductive foam layer prepared using a carrier with a smooth surface will have a substantially smoother surface than an electrically conductive foam layer prepared without a smooth carrier. Specifically, an electrically conductive foam layer prepared using a top carrier and a bottom carrier, both with a smooth surface, can have a smoother surface, lower density, non-protrusion of particles above the surface, better sealing, and a thickness that approximates a single layer of cells to minimize the disruption of particle columns for maximum conductivity.

Figure 2:
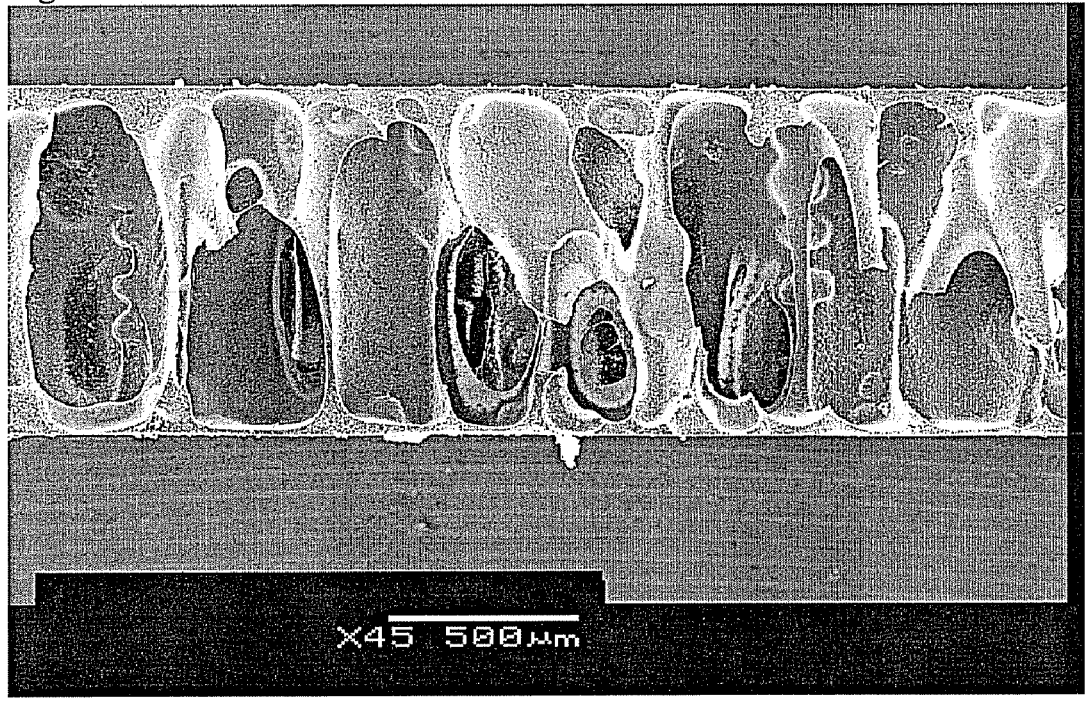
FIG. 2 is a scanning electron microscope (SEM) photograph of an electrically conductive polymer foam manufactured as described herein.
Figure 3:
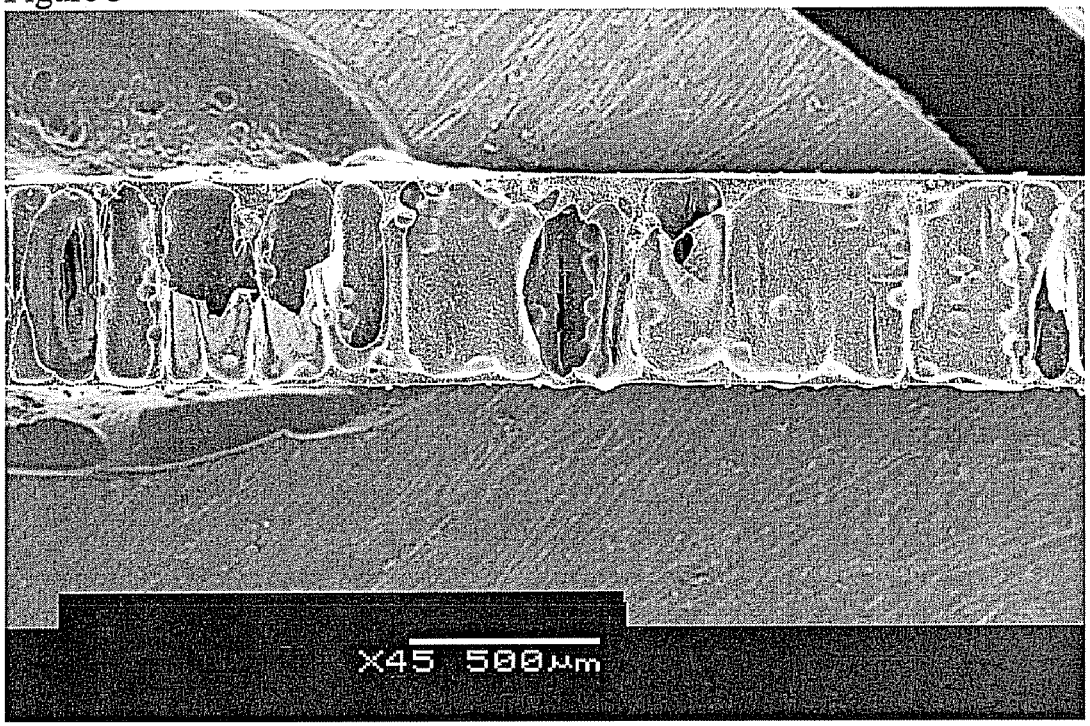
FIG. 3 is an SEM photograph of an electrically conductive polymer foam manufactured as described herein.

Referring to the Figures, FIGS. 2 and 3 are SEM photographs of a foam layer having a thickness of about a single cell. The foam layer is manufactured using a smooth surface carrier substrate. As can be seen, the particles do not protrude from the surfaces of the layer. Thus, in one embodiment, the thickness of the cured polymer foam layer is 1.0 to 1.5 times the average height of the cells in the foam. In another embodiment, the thickness of the cured polymer foam layer is 1.0 to 1.3 times the average height of the cells in the foam. In still another embodiment, the thickness of the cured polymer foam layer is 1.0 to 1.2 times the average height of the cells in the foam. It is to be understood that while use of a top carrier provides foams of very good quality, it is also possible to obtain conductive foams as described herein without use of a top carrier.

Figure 4:
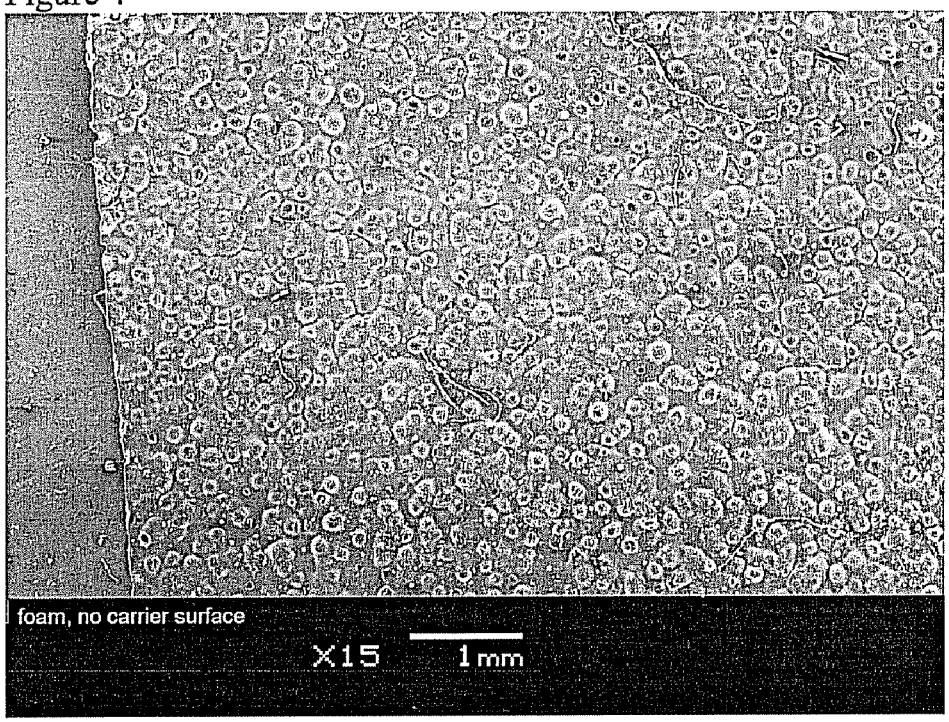
FIG. 4 is an SEM photograph of the top surface of a polymer foam prepared without the use of a second (top) carrier substrate.
Figure 5:
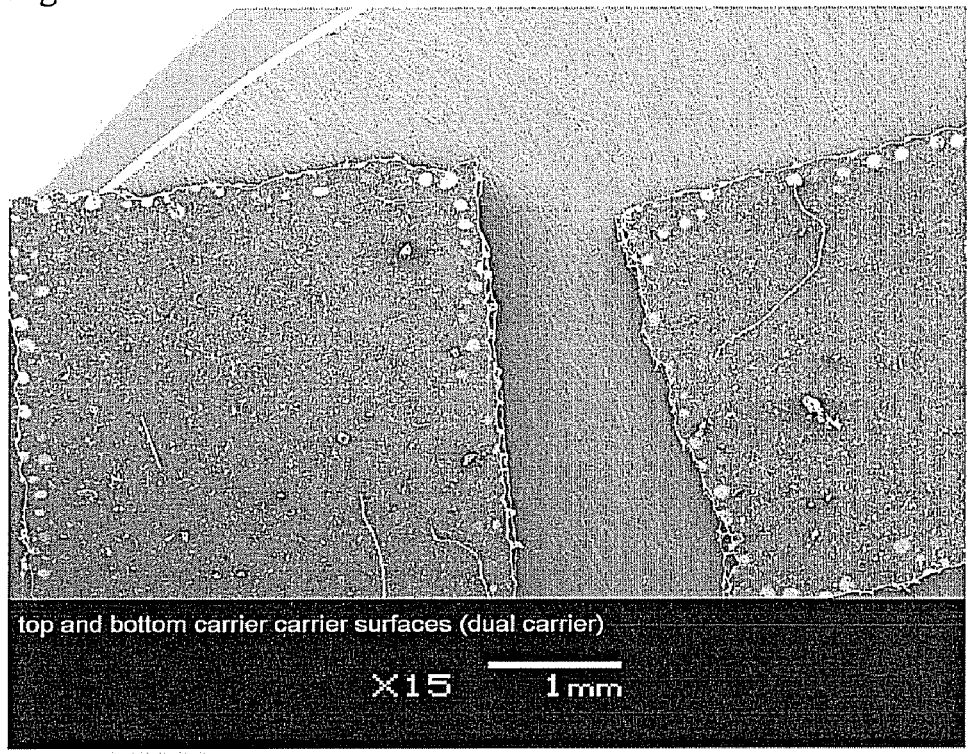
FIG. 5 is an SEM photograph of the top and bottom surfaces of electrically conductive polymer foam prepared using two carrier substrates (top and bottom).

FIG. 4 is a SEM photograph of the top surface of a foam prepared by casting onto a single carrier, and processed without the use of a top carrier. The surface of the foam is accordingly not smooth. In comparison, FIG. 5 is an SEM photograph of the top and bottom surfaces of a foam prepared with the use of smooth top and bottom carrier substrates. The surfaces disposed on the smooth carrier substrate are substantially smoother than the top surface of the foam shown in FIG. 4.

As is known in the art, a polymer foam is manufactured from a precursor composition that is mixed prior to or concomitant with foaming. Foaming can be by mechanical frothing or blowing (using chemical or physical blowing agents, or both), or a combination of mechanical frothing and blowing (using chemical or physical blowing agents, or both). Without being bound by theory, it is believed that when chemical and/or physical blowing agents are used, cell formation that occurs after alignment of the chains can disrupt the chains, leading to lower conductivity. Limiting the thickness of the layer of foam as described herein appears to minimize such disruption. When foams are produced by mechanical frothing alone, or when the chemical and/or physical blowing is substantially complete prior to alignment of the particles, it is possible to achieve adequate conductivity without limiting the thickness of the foam to 1 to 1.5 times the cell height. Without being bound by theory, it is believed that the absence of further foaming after casting allows the formation of stable columns. Thus, in one embodiment, a method of manufacturing a polymer foam layer comprises forming a layer having a first surface and an opposite second surface, the layer comprising a polymer foam precursor composition; and a filler composition comprising a plurality of magnetic, electrically conductive particles; foaming the foam precursor composition to form a plurality of cells in the layer; applying to the layer a magnetic field of a strength and for a time effective to align the magnetic, electrically conductive particles into mutually isolated chains between the first surface and the opposite second surface of the layer; and curing the foamed layer, wherein the thickness of the cured layer is not limited to 1.0 to 1.5 times the average height of the plurality of cells in the cured layer. In this embodiment, the foam is completely or substantially completely frothed and/or blown prior to application of the magnetic field. As used herein, "substantially completely" means that any further foam development does not substantially disrupt column formation.

Specific polymers for use in the manufacture of the foams include polyurethane foams and silicone foams. Polyurethane foams are formed from precursor compositions comprising an organic polyisocyanate component, an active hydrogen-containing component reactive with the polyisocyanate component, a surfactant, and a catalyst. The process of forming the foam can use chemical or physical blowing agents, or the foam can be mechanically frothed. For example, one process of forming the foam comprises substantially and uniformly dispersing inert gas throughout a mixture of the above-described composition by mechanical beating of the mixture to form a heat curable froth that is substantially structurally and chemically stable, but workable at ambient conditions; and curing the froth to form a cured foam. In one embodiment, a physical blowing agent is introduced into the froth to further reduce foam density during the crosslinking process. In another embodiment, the polyurethane foam is formed from the reactive composition using only physical or chemical blowing agents, without the use of any mechanical frothing.

Suitable organic polyisocyanates include isocyanates having the general formula:

$$Q(NCO)_i$$

wherein i is an integer of two or more and Q is an organic radical having the valence of i, wherein i has an average value greater than 2. Q can be a substituted or unsubstituted hydrocarbon group (i.e., an alkylene or an arylene group), or a group having the formula $Q^1$—Z—$Q^1$ wherein $Q^1$ is an alkylene or arylene group and Z is —O—, —O—$Q^1$—S, —CO—, —S—, —S—$Q^1$—S—, —SO—, —SO$_2$—, alkylene or arylene. Examples of such polyisocyanates include hexamethylene diisocyanate, 1,8-diisocyanato-p-methane, xylyl diisocyanate, diisocyanatocyclohexane, phenylene diisocyanates, tolylene diisocyanates, including 2,4-tolylene diisocyanate, 2,6-tolylene diisocyanate, and crude tolylene diisocyanate, bis(4-isocyanatophenyl)methane, chlorophenylene diisocyanates, diphenylmethane-4,4'-diisocyanate (also known as 4,4'-diphenyl methane diisocyanate, or MDI) and adducts thereof, naphthalene-1,5-diisocyanate, triphenylmethane-4,4',4"-triisocyanate, isopropylbenzene-alpha-4-diisocyanate, and polymeric isocyanates such as polymethylene polyphenylisocyanate.

Q can also represent a polyurethane radical having a valence of i in which case Q(NCO)$_i$ is a composition known as a prepolymer. Such prepolymers are formed by reacting a stoichiometric excess of a polyisocyanate as above with an active hydrogen-containing component, especially the polyhydroxyl-containing materials or polyols described below. In one embodiment, the polyisocyanate is employed in proportions of about 30 percent to about 200 percent stoichiometric excess, the stoichiometry being based upon equivalents of isocyanate group per equivalent of hydroxyl in the polyol. The amount of polyisocyanate employed will vary slightly depending upon the nature of the polyurethane being prepared.

The active hydrogen-containing component can comprise polyether polyols and polyester polyols. Suitable polyester polyols are inclusive of polycondensation products of polyols with dicarboxylic acids or ester-forming derivatives thereof (such as anhydrides, esters and halides), polylactone polyols obtainable by ring-opening polymerization of lactones in the presence of polyols, polycarbonate polyols obtainable by reaction of carbonate diesters with polyols, and castor oil polyols. Suitable dicarboxylic acids and derivatives of dicarboxylic acids which are useful for producing polycondensation polyester polyols are aliphatic or cycloaliphatic dicarboxylic acids such as glutaric, adipic, sebacic, fumaric and maleic acids; dimeric acids; aromatic dicarboxylic acids such as, but not limited to phthalic, isophthalic and terephthalic acids; tribasic or higher functional polycarboxylic acids such as pyromellitic acid; as well as anhydrides and second alkyl esters, such as, but not limited to maleic anhydride, phthalic anhydride and dimethyl terephthalate.

Additional active hydrogen-containing components are the polymers of cyclic esters. Suitable cyclic ester monomers include, but are not limited to δ-valerolactone, ε-caprolactone, zeta-enantholactone, the monoalkyl-valerolactones, e.g., the monomethyl-, monoethyl-, and monohexyl-valerolactones. Suitable polyester polyols include caprolactone based polyester polyols, aromatic polyester polyols, ethylene glycol adipate based polyols, and mixtures comprising any one of the foregoing polyester polyols. Exemplary polyester polyols are polyester polyols made from ε-caprolactones, adipic acid, phthalic anhydride, terephthalic acid, or dimethyl esters of terephthalic acid.

The polyether polyols are obtained by the chemical addition of alkylene oxides, such as ethylene oxide, propylene oxide and mixtures thereof, to water or polyhydric organic components, such as ethylene glycol, propylene glycol, trimethylene glycol, 1,2-butylene glycol, 1,3-butanediol, 1,4-butanediol, 1,5-pentanediol, 1,2-hexylene glycol, 1,10-decanediol, 1,2-cyclohexanediol, 2-butene-1,4-diol, 3-cyclohexene-1,1-dimethanol, 4-methyl-3-cyclohexene-1,1-dimethanol, 3-methylene-1,5-pentanediol, diethylene glycol, (2-hydroxyethoxy)-1-propanol, 4-(2-hydroxyethoxy)-1-butanol, 5-(2-hydroxypropoxy)-1-pentanol, 1-(2-hydroxymethoxy)-2-hexanol, 1-(2-hydroxypropoxy)-2-octanol, 3-allyloxy-1,5-pentanediol, 2-allyloxymethyl-2-methyl-1,3-propanediol, [4,4- pentyloxy)-methyl]-1,3-propanediol, 3-(o-propenylphenoxy)-1,2-propanediol, 2,2'-diisopropylidenebis(p-phenyleneoxy)diethanol, glycerol, 1,2,6-hexanetriol, 1,1,1-trimethylolethane, 1,1,1-trimethylolpropane, 3-(2-hydroxyethoxy)-1,2-propanediol, 3-(2-hydroxypropoxy)- 1,2-propanediol, 2,4-dimethyl-2-(2-hydroxyethoxy)-methylpentanediol-1,5; 1,1,1-tris[2-hydroxyethoxy) methyl]-ethane, 1,1,1-tris[2-hydroxypropoxy)-methyl] propane, diethylene glycol, dipropylene glycol, pentaerythritol, sorbitol, sucrose, lactose, alpha-methylglucoside, alpha-hydroxyalkylglucoside, novolac resins, phosphoric acid, benzenephosphoric acid, polyphosphoric acids such as tripolyphosphoric acid and tetrapolyphosphoric acid, ternary condensation products, and the like. The alkylene oxides employed in producing polyoxyalkylene polyols normally have from 2 to 4 carbon atoms. Exemplary alkylene oxides are propylene oxide and mixtures of propylene oxide with ethylene oxide. The polyols listed above can be used per se as the active hydrogen component.

A suitable class of polyether polyols is represented generally by the following formula

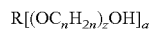

wherein R is hydrogen or a polyvalent hydrocarbon radical; a is an integer (i.e., 1 or 2 to 6 to 8) equal to the valence of R, n in each occurrence is an integer from 2 to 4 inclusive (specifically 3) and z in each occurrence is an integer having a value of from 2 to about 200, specifically from 15 to about 100. In one embodiment, the polyether polyol comprises a mixture of one or more of dipropylene glycol, 1,4-butanediol, 2-methyl-1,3-propanediol, or the like, or combinations comprising at least one of the foregoing polyether polyols.

Other types of active hydrogen-containing materials that can be used are polymer polyol compositions obtained by polymerizing ethylenically unsaturated monomers in a polyol. Suitable monomers for producing such compositions include acrylonitrile, vinyl chloride, styrene, butadiene, vinylidene chloride, and other ethylenically unsaturated monomers. The polymer polyol compositions comprise greater than or equal to about 1, specifically greater than or equal to about 5, and more specifically greater than or equal to about 10 wt % monomer polymerized in the polyol where the weight percent is based on the total amount of polyol. In one embodiment, the polymer polyol compositions comprise less than or equal to about 70, specifically less than or equal to about 50, more specifically less than or equal to about 40 wt % monomer polymerized in the polyol. Such compositions are conveniently prepared by polymerizing the monomers in the selected polyol at a temperature of 40° C. to 150° C. in the presence of a free radical polymerization catalyst such as peroxides, persulfates, percarbonate, perborates, and azo compounds.

The active hydrogen-containing component can also contain polyhydroxyl-containing compounds, such as hydroxyl-terminated polyhydrocarbons, hydroxyl-terminated polyformals, fatty acid triglycerides, hydroxyl-terminated polyesters, hydroxymethyl-terminated perfluoromethylenes, hydroxyl-terminated polyalkylene ether glycols hydroxyl-terminated polyalkylenearylene ether glycols, and hydroxyl-terminated polyalkylene ether triols.

The polyols can have hydroxyl numbers that vary over a wide range. In general, the hydroxyl numbers of the polyols, including other cross-linking additives, if employed, are present in an amount of about 28 to about 1000, and higher, specifically about 100 to about 800. The hydroxyl number is defined as the number of milligrams of potassium hydroxide used for the complete neutralization of the hydrolysis product of the fully acetylated derivative prepared from 1 gram of polyol or mixtures of polyols with or without other cross-linking additives. The hydroxyl number can also be defined by the equation:

$$OH = \frac{56.1 \times 1000 \times f}{M.W.}$$

wherein OH is the hydroxyl number of the polyol, $f$ is the average functionality, that is the average number of hydroxyl groups per molecule of polyol, and M.W. is the average molecular weight of the polyol.

Where used, a large number of suitable blowing agents or a mixture of blowing agents are suitable, particularly water. The water reacts with the isocyanate component to yield $CO_2$ gas, which provides the additional blowing necessary. In one embodiment when water is used as the blowing agent, the curing reaction is controlled by selectively employing catalysts. In one embodiment, compounds that decompose to liberate gases (e.g., azo compounds) can also be used.

Especially suitable blowing agents are physical blowing agents comprising hydrogen atom-containing components, which can be used alone or as mixtures with each other or with another type of blowing agent such as water or azo compounds. These blowing agents can be selected from a broad range of materials, including hydrocarbons, ethers, esters and partially halogenated hydrocarbons, ethers and esters, and the like. Suitable physical blowing agents have a boiling point between about −50° C. and about 100° C., and specifically between about −50° C. and about 50° C. Among the usable hydrogen-containing blowing agents are the HCFC's (halo chlorofluorocarbons) such as 1,1-dichloro-1-fluoroethane, 1,1-dichloro-2,2,2-trifluoro-ethane, monochlorodifluoromethane, and 1-chloro-1,1-difluoroethane; the HFCs (halo fluorocarbons) such as 1,1,1,3,3,3-hexafluoropropane, 2,2,4,4-tetrafluorobutane, 1,1,1,3,3,3-hexafluoro-2-methylpropane, 1,1,1,3,3-pentafluoropropane, 1,1,1,2,2-pentafluoropropane, 1,1,1,2,3-pentafluoropropane, 1,1,2,3,3-pentafluoropropane, 1,1,2,2,3-pentafluoropropane, 1,1,1,3,3,4-hexafluorobutane, 1,1,1,3,3-pentafluorobutane, 1,1,1,4,4,4-hexafluorobutane, 1,1,1,4,4-pentafluorobutane, 1,1,2,2,3,3-hexafluoropropane, 1,1,1,2,3,3-hexafluoropropane, 1,1-difluoroethane, 1,1,1,2-tetrafluoroethane, and pentafluoroethane; the HFE's (halo fluoroethers) such as methyl-1,1,1,-trifluoroethylether and difluoromethyl-1,1,1-trifluoroethylether; and the hydrocarbons such as n-pentane, isopentane, and cyclopentane.

When used, the blowing agents including water generally comprise greater than or equal to 1, specifically greater than or equal to 5 weight percent (wt %) of the polyurethane liquid phase composition. In one embodiment, the blowing agent is present in an amount of less than or equal to about 30, specifically less than or equal to 20 wt % of the polyurethane liquid phase composition. When a blowing agent has a boiling point at or below ambient temperature, it is maintained under pressure until mixed with the other components.

Suitable catalysts used to catalyze the reaction of the isocyanate component with the active hydrogen-containing component include organic and inorganic acid salts of, and organometallic derivatives of bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. Examples of such catalysts are dibutyltin dilaurate, dibutyltin diacetate, stannous octoate, lead octoate, cobalt naphthenate, triethylamine, triethylenediamine, N,N,N',N'-tetramethylethylenediamine, 1,1,3,3-tetramethylguanidine, N,N,N'N'-tetramethyl-1,3-butanediamine, N,N-dimethylethanolamine, N,N-diethylethanolamine, 1,3,5-tris (N,N-dimethylaminopropyl)-s-hexahydrotriazine, o- and p-(dimethylaminomethyl) phenols, 2,4,6-tris(dimethylaminomethyl) phenol, N,N-dimethylcyclohexylamine, pentamethyldiethylenetriamine, 1,4-diazobicyclo [2.2.2] octane, N-hydroxyl-alkyl quaternary ammonium carboxylates and tetramethylammonium formate, tetramethylammonium acetate, tetramethylammonium 2-ethylhexanoate and the like, as well as compositions comprising any one of the foregoing catalysts.

In one embodiment, the catalyst comprises a metal acetyl acetonate. Suitable metal acetyl acetonates include metal acetyl acetonates based on metals such as aluminum, barium, cadmium, calcium, cerium (III), chromium (III), cobalt (II), cobalt (III), copper (II), indium, iron (II), lanthanum, lead (II), manganese (II), manganese (III), neodymium, nickel (II), palladium (II), potassium, samarium, sodium, terbium, titanium, vanadium, yttrium, zinc and zirconium. An exemplary catalyst is bis(2,4-pentanedionate) nickel (II) (also known as nickel acetylacetonate or diacetylacetonate nickel) and derivatives thereof such as diacetonitrilediacetylacetonato nickel, diphenylnitrilediacetylacetonato nickel, bis(triphenylphosphine)diacetyl acetylacetonato nickel, and the like. Ferric acetylacetonate (FeAA) is also a suitable catalyst, due to its relative stability, good catalytic activity, and lack of toxicity. In one embodiment, the metal acetylacetonate is conveniently added by predissolution in a suitable solvent such as dipropylene glycol or other hydroxyl containing components which will then participate in the reaction and become part of the final product.

In one method of producing the polyurethane foams, the components for producing the foams, i.e., the isocyanate component, the active hydrogen-containing component, surfactant, catalyst, optional blowing agents, electrically conductive, flame retardant filler and other additives are first mixed together then subjected to mechanical frothing with air. Alternatively, the ingredients can be added sequentially to the liquid phase during the mechanical frothing process. The gas phase of the froths is most specifically air because of its cheapness and ready availability. However, if desired, other gases can be used which are gaseous at ambient conditions and which are substantially inert or non-reactive with any component of the liquid phase. Such other gases include, for example, nitrogen, carbon dioxide, and fluorocarbons that are normally gaseous at ambient temperatures. The inert gas is incorporated into the liquid phase by mechanical beating of the liquid phase in high shear equipment such as in a Hobart mixer or an Oakes mixer. The gas can be introduced under pressure as in the usual operation of an Oakes mixer or it can be drawn in from the overlying atmosphere by the beating or whipping action as in a Hobart mixer. The mechanical beating operation specifically is conducted at pressures not greater than 7 to 14 kg/cm$^2$ (100 to 200 pounds per square inch (psi)). Readily available mixing equipment can be used and no special equipment is generally necessary. The amount of inert gas beaten into the liquid phase is controlled by gas flow metering equipment to produce a froth of the desired density. The mechanical beating is conducted over a period of a few seconds in an Oakes mixer, or about 3 to about 30 minutes in a Hobart mixer, or however long it takes to obtain the desired froth density in the mixing equipment employed. The froth as it emerges from the mechanical beating operation is substantially chemically stable and is structurally stable but easily workable at ambient temperatures, e.g., about 10° C. to about 40° C.

After frothing, the reactive mixture is transferred at a controlled rate through a hose or other conduit to be deposited onto a first carrier. For convenience, this first carrier can be referred to as "bottom carrier," and is generally a moving support that can or can not readily release the cured foam. A second carrier, also referred to herein as "surface protective layer" or "top carrier" can be placed on top of the froth. The top carrier is also a moving support that also can or can not readily release from the cured foam. The top carrier can be applied almost simultaneously with the froth. Before applying the top carrier, the foam can be spread to a layer of desired thickness by a doctoring blade or other suitable spreading device. Alternatively, placement of the top carrier can be used to spread the foam and adjust the frothed layer to the desired thickness. In still another embodiment, a coater can be used after placement of the top carrier to adjust the height of the foam. After application of the top carrier, the frothed foam is blown under the influence of a physical or chemical blowing agent. In one embodiment, the carriers impart a substantially flat surface to the surface of the foam. In one embodiment, the entire assembly is then placed in a magnet and oven to both align the particles and cure the polymer foam.

The assembly of the carrier(s) and foam layer (after optional blowing) is delivered to a heating zone and magnetic field for aligning the electrically conductive particles and curing the foam. The temperatures are maintained in a range suitable for curing the foam, for example at about 90° C. to about 220° C., depending on the composition of the foam material. Differential temperatures can be established for purposes of forming an integral skin on an outside surface of the foam or for adding a relatively heavy layer to the foam.

After the foam is heated and cured, it can then be passed to a cooling zone where it is cooled by any suitable cooling device such as fans. Where appropriate, the carriers are removed and the foam can be taken up on a roll. Alternatively, the foam can be subjected to further processing, for example lamination (bonding using heat and pressure) to one or both of the carrier layers.

In a specific embodiment, a method of manufacturing a polymer foam comprises frothing a liquid composition comprising a polyisocyanate component, an active hydrogen-containing component reactive with the polyisocyanate component, a surfactant, a catalyst, and a filler composition comprising a plurality of magnetic, electrically conductive particles; casting the froth to form a layer having a first surface and an opposite second surface; and exposing the layer to a magnetic field to align the magnetic, electrically conductive particles into mutually isolated chains that essentially continuously span the layer between the first surface and the second surface; and curing the layer to produce a polyurethane foam having a density of about 1 to about 125 pounds per cubic foot, an elongation of greater than or equal to about 20%, and a compression set of less than or equal to about 30, wherein the thickness of the foam is 1.0 to 1.5 times the average height of the plurality of cells in the cured layer. This method can further comprise partially curing the layer prior to fully curing the layer, wherein the magnetic field is applied after partially curing the layer. Even further, the froth is cast onto a first carrier substrate. Preferably, a second carrier substrate is disposed on a side of the froth opposite the first carrier substrate. The froth can be further blown after disposing the second carrier substrate, and the magnetic field is optionally applied after blowing the froth.

In one embodiment, the electrically conductive polyurethane foam has mechanical properties similar to those of the same polyurethane foam without the coated flame retardant particles. If auxiliary blowing agents are employed, the resultant foam can have a bulk density as low as about 1 pcf.

Silicone foams comprising a polysiloxane polymer and electrically conductive particles can also be used.

In one embodiment, the silicone foams are produced as a result of the reaction between water and hydride groups in a polysiloxane polymer precursor composition with the consequent liberation of hydrogen gas. This reaction is generally catalyzed by a noble metal, specifically a platinum catalyst. In one embodiment, the polysiloxane polymer has a viscosity of about 100 to 1,000,000 poise at 25° C. and has chain substituents selected from the group consisting of hydride, methyl, ethyl, propyl, vinyl, phenyl, and trifluoropropyl. The end groups on the polysiloxane polymer can be hydride, hydroxyl, vinyl, vinyl diorganosiloxy, alkoxy, acyloxy, allyl, oxime, aminoxy, isopropenoxy, epoxy, mercapto groups, or other known, reactive end groups. Suitable silicone foams can also be produced by using several polysiloxane polymers, each having different molecular weights (e.g., bimodal or trimodal molecular weight distributions) as long as the viscosity of the combination lies within the above specified values. It is also possible to have several polysiloxane base polymers with different functional or reactive groups in order to produce the desired foam. In one embodiment, the polysiloxane polymer comprises about 0.2 moles of hydride (Si—H) groups per mole of water.

Depending upon the chemistry of the polysiloxane polymers used, a catalyst, generally platinum or a platinum-containing catalyst, can be used to catalyze the blowing and the curing reaction. The catalyst can be deposited onto an inert carrier, such as silica gel, alumina, or carbon black. In one embodiment, an unsupported catalyst selected from among chloroplatinic acid, its hexahydrate form, its alkali metal salts, and its complexes with organic derivatives is used. Exemplary catalysts are the reaction products of chloroplatinic acid with vinylpolysiloxanes such as 1,3-divinyltetramethyldisiloxane, which are treated or otherwise with an alkaline agent to partly or completely remove the chlorine atoms; the reaction products of chloroplatinic acid with alcohols, ethers, and aldehydes; and platinum chelates and platinous chloride complexes with phosphines, phosphine oxides, and with olefins such as ethylene, propylene, and styrene. It can also be desirable, depending upon the chemistry of the polysiloxane polymers to use other catalysts such as dibutyl tin dilaurate in lieu of platinum based catalysts.

Various platinum catalyst inhibitors can also be used to control the kinetics of the blowing and curing reactions in order to control the porosity and density of the silicone foams. Examples of such inhibitors include polymethylvinylsiloxane cyclic compounds and acetylenic alcohols. These inhibitors should not interfere with the foaming and curing in such a manner that destroys the foam.

Physical or chemical blowing agents can be used to produce the silicone foam, including the physical and chemical blowing agents listed above for polyurethanes. Other examples of chemical blowing agents include benzyl alcohol, methanol, ethanol, isopropyl alcohol, butanediol, and silanols. In one embodiment, a combination of methods of blowing is used to obtain foams having desirable characteristics. For example, a physical blowing agent such as a chlorofluorocarbon can be added as a secondary blowing agent to a reactive mixture wherein the primary mode of blowing is the hydrogen released as the result of the reaction between water and hydride substituents on the polysiloxane.

In the production of silicone foams, the reactive components of the precursor composition are stored in two packages, one containing the platinum catalyst and the other the polysiloxane polymer containing hydride groups, which prevents premature reaction. It is possible to include the electrically conductive particles in either package. In another method of production, the polysiloxane polymer is introduced into an extruder along with the electrically conductive particles, water, physical blowing agents if necessary, and other desirable additives. The platinum catalyst is then metered into the extruder to start the foaming and curing reaction. The use of physical blowing agents such as liquid carbon dioxide or supercritical carbon dioxide in conjunction with chemical blowing agents such as water can give rise to foam having much lower densities. In yet another method, the liquid silicone components are metered, mixed and dispensed into a device such a mold or a continuous coating line. The foaming then occurs either in the mold or on the continuous coating line.

In one embodiment, the entire assembly comprising the platinum catalyst, the polysiloxane polymer containing hydride groups, electrically conductive particles, physical, and/or chemical blowing agents, optional platinum catalyst inhibitors, and other desired additives are placed in a magnetic field. Foaming can occur before or during exposure to the magnetic field.

The electrically conductive silicone foams can have mechanical properties that are the same or substantially similar to those of the same silicone foams without the electrically conductive particles.

Alternatively, a soft, electrically conductive silicone composition can be formed by the reaction of a precursor composition comprising a liquid silicone composition comprising a polysiloxane having at least two alkenyl groups per molecule; a polysiloxane having at least two silicon-bonded hydrogen atoms in a quantity effective to cure the composition; a catalyst; and optionally a reactive or non-reactive polysiloxane fluid having a viscosity of about 100 to about 1000 centipoise. Suitable reactive silicone compositions are low durometer, 1:1 liquid silicone rubber (LSR) or liquid injection molded (LIM) compositions. Because of their low inherent viscosity, the use of the low durometer LSR or LIM facilitates the addition of higher filler quantities, and results in formation of a soft foam.

The reactive or non-reactive polysiloxane fluid allows higher quantities of filler to be incorporated into the cured silicone composition, thus lowering the obtained volume and surface resistivity values. In one embodiment, the polysiloxane fluid remains within the cured silicone and is not extracted or removed. The reactive silicone fluid thus becomes part of the polymer matrix, leading to low outgassing and little or no migration to the surface during use. In one embodiment, the boiling point of the non-reactive silicone fluid is high enough such that when it is dispersed in the polymer matrix, it does not evaporate during or after cure, and does not migrate to the surface or outgas.

In one embodiment, LSR or LIM systems are provided as two-part formulations suitable for mixing in ratios of about 1:1 by volume. The "A" part of the formulation comprises one or more polysiloxanes having two or more alkenyl groups and has an extrusion rate of less than about 500 g/minute. Suitable alkenyl groups are exemplified by vinyl, allyl, butenyl, pentenyl, hexenyl, and heptenyl, with vinyl being particularly suitable. The alkenyl group can be bonded at the molecular chain terminals, in pendant positions on the molecular chain, or both. Other silicon-bonded organic groups in the polysiloxane having two or more alkenyl groups are exemplified by substituted and unsubstituted monovalent hydrocarbon groups, for example, alkyl groups such as methyl, ethyl, propyl, butyl, pentyl, and hexyl; aryl groups such as phenyl, tolyl, and xylyl; aralkyl groups such as benzyl and phenethyl; and halogenated alkyl groups such as 3-chloropropyl and 3,3,3-trifluoropropyl. Exemplary substituents are methyl and phenyl groups.

The alkenyl-containing polysiloxane can have straight chain, partially branched straight chain, branched-chain, or network molecule structure, or can be a mixture of two or more selections from polysiloxanes with the exemplified molecular structures. The alkenyl-containing polysiloxane is exemplified by trimethylsiloxy-endblocked dimethylsiloxane-methylvinylsiloxane copolymers, trimethylsiloxy-endblocked methylvinylsiloxane-methylphenylsiloxane copolymers, trimethylsiloxy-end blocked dimethylsiloxane-methylvinylsiloxane-methylphenylsiloxane copolymers, dimethylvinylsiloxy-endblocked dimethylpolysiloxanes, dimethylvinylsiloxy-endblocked methylvinylpolysiloxanes, dimethylvinylsiloxy-endblocked methylvinylphenylsiloxanes, dimethylvinylsiloxy-endblocked dimethylvinylsiloxane-methylvinylsiloxane copolymers, dimethylvinylsiloxy-endblocked dimethylsiloxane-methylphenylsiloxane copolymers, dimethylvinylsiloxy-endblocked dimethylsiloxane-diphenylsiloxane copolymers, polysiloxane comprising $R_3SiO_{1/2}$ and $SiO_{4/2}$ units, polysiloxane comprising $RSiO_{3/2}$ units, polysiloxane comprising the $R_2SiO_{2/2}$ and $RSiO_{3/2}$ units, polysiloxane comprising the $R_2SiO_{2/2}$, $RSiO_{3/2}$ and $SiO_{4/2}$ units, and a mixture of two or more of the preceding polysiloxanes. R represents substituted and unsubstituted monovalent hydrocarbon groups, for example, alkyl groups such as methyl, ethyl, propyl, butyl, pentyl, and hexyl; aryl groups such as phenyl, tolyl, and xylyl; aralkyl groups such as benzyl and phenethyl; and halogenated alkyl groups such as 3-chloropropyl and 3,3,3-trifluoropropyl, with the proviso that at least 2 of the R groups per molecule are alkenyl.

The "B" component of the LSR or LIM system comprises one or more polysiloxanes that contain at least two silicon-bonded hydrogen atoms per molecule and has an extrusion rate of less than about 500 g/minute. The hydrogen can be bonded at the molecular chain terminals, in pendant positions on the molecular chain, or both. Other silicon-bonded groups are organic groups exemplified by non-alkenyl, substituted and unsubstituted monovalent hydrocarbon groups, for example, alkyl groups such as methyl, ethyl, propyl, butyl, pentyl, and hexyl; aryl groups such as phenyl, tolyl, and xylyl; aralkyl groups such as benzyl and phenethyl; and halogenated alkyl groups such as 3-chloropropyl and 3,3,3-trifluoropropyl. Exemplary substituents are methyl and phenyl groups.

The hydrogen-containing polysiloxane component can have straight-chain, partially branched straight-chain, branched-chain, cyclic, network molecular structure, or can be a mixture of two or more selections from polysiloxanes with the exemplified molecular structures. The hydrogen-containing polysiloxane is exemplified by trimethylsiloxy-endblocked methylhydrogenpolysiloxanes, trimethylsiloxy-endblocked dimethylsiloxane-methylhydrogensiloxane copolymers, trimethylsiloxy-endblocked methylhydrogensiloxane-methylphenylsiloxane copolymers, trimethylsiloxy-endblocked dimethylsiloxane-methylhydrogensiloxane-methylphenylsiloxane copolymers, dimethylhydrogensiloxy-endblocked dimethylpolysiloxanes, dimethylhydrogensiloxy-endblocked methylhydrogenpolysiloxanes, dimethylhydrogensiloxy-endblocked dimethylsiloxanes-methylhydrogensiloxane copolymers, dimethylhydrogensiloxy-endblocked dimethylsiloxane-methylphenylsiloxane copolymers, and dimethylhydrogensiloxy-endblocked methylphenylpolysiloxanes.

The hydrogen-containing polysiloxane component is added in an amount sufficient to cure the composition, specifically in a quantity of about 0.5 to about 10 silicon-bonded hydrogen atoms per alkenyl group in the alkenyl-containing polysiloxane.

The silicone composition further comprises, generally as part of Component "A," a catalyst such as platinum to accelerate the cure. Platinum and platinum compounds known as hydrosilylation-reaction catalysts can be used, for example platinum black, platinum-on-alumina powder, platinum-on-silica powder, platinum-on-carbon powder, chloroplatinic acid, alcohol solutions of chloroplatinic acid platinum-olefin complexes, platinum-alkenylsiloxane complexes and the catalysts afforded by the microparticulation of the dispersion of a platinum addition-reaction catalyst, as described above, in a thermoplastic resin such as methyl methacrylate, polycarbonate, polystyrene, silicone, and the like. Mixtures of catalysts can also be used. A quantity of catalyst effective to cure the present composition is generally from 0.1 to 1,000 parts per million (by weight) of platinum metal based on the combined amounts of alkenyl and hydrogen components.

The composition optionally further comprises one or more polysiloxane fluids having a viscosity of less than or equal to about 1000 centipoise, specifically less than or equal to about 750 centipoise, more specifically less than or equal to about 600 centipoise, and most specifically less than or equal to about 500 centipoise. The polysiloxane fluids can also have a viscosity of greater than or equal to about 100 centipoises. The polysiloxane fluid component is added for the purpose of decreasing the viscosity of the composition, thereby allowing at least one of increased filler loading, enhanced filler wetting, and enhanced filler distribution, and resulting in cured compositions having lower resistance and resistivity values. Use of the polysiloxane fluid component can also reduce the dependence of the resistance value on temperature, and/or reduce the timewise variations in the resistance and resistivity values. Use of the polysiloxane fluid component obviates the need for an extra step during processing to remove the fluid, as well as possible outgassing and migration of diluent during use. The polysiloxane fluid should not inhibit the curing reaction, that is, the addition reaction, of the composition, but it may or may not participate in the curing reaction.

The non-reactive polysiloxane fluid has a boiling point of greater than about 500° F. (260° C.), and can be branched or straight-chained. The non-reactive polysiloxane fluid comprises silicon-bonded non-alkenyl organic groups exemplified by substituted and unsubstituted monovalent hydrocarbon groups, for example, alkyl groups such as methyl, ethyl, propyl, butyl, pentyl, and hexyl; aryl groups such as phenyl, tolyl, and xylyl; aralkyl groups such as benzyl and phenethyl; and halogenated alkyl groups such as 3-chloropropyl and 3,3,3-trifluoropropyl. Exemplary substituents are methyl and phenyl groups. Thus, the non-reactive polysiloxane fluid can comprise $R_3SiO_{1/2}$ and $SiO4_{4/2}$ units, $RSiO_{3/2}$ units, $R_2SiO_{2/2}$ and $RSiO_{3/2}$ units, or $R_2SiO_{2/2}$, $RSiO_{3/2}$ and $SiO_{4/2}$ units, wherein R represents substituted and unsubstituted monovalent hydrocarbon groups selected from the group consisting of alkyl, methyl, ethyl, propyl, butyl, pentyl, hexyl, aryl, phenyl, tolyl, xylyl, aralkyl, benzyl, phenethyl, halogenated alkyl, 3-chloropropyl, and 3,3,3-trifluoropropyl. Because the non-reactive polysiloxane is a fluid and has a significantly higher boiling point (greater than about 230° C. (500° F.)), it allows the incorporation of higher quantities of filler, but does not migrate or outgas. Examples of non-reactive polysiloxane fluids include DC 200 from Dow Corning Corporation.

Reactive polysiloxane fluids co-cure with the alkenyl-containing polysiloxane and the polysiloxane having at least two silicon-bonded hydrogen atoms, and therefore can themselves contain alkenyl groups or silicon-bonded hydrogen groups. Such compounds can have the same structures as described above in connection with the alkenyl-containing polysiloxane and the polysiloxane having at least two silicon-bonded hydrogen atoms, but in addition have a viscosity of less than or equal to about 1000 centipoise (cps), specifically less than or equal to about 750 cps, more specifically less than or equal to about 600 cps, and most specifically less than or equal to about 500 cps. In one embodiment, the reactive polysiloxane fluids have a boiling point greater than the curing temperature of the addition cure reaction.

The polysiloxane fluid component is present in amount effective to allow the addition, incorporation, and wetting of higher quantities of conductive filler and/or to facilitate incorporation of the electrically conductive particles, for example to facilitate detangling and/or dispersion. In one embodiment, the polysiloxane fluid component is added to the composition in an amount of about 5 to about 50 weight parts per 100 weight parts of the combined amount of the polysiloxane having at least two alkenyl groups per molecule, the polysiloxane having at least two silicon-bonded hydrogen atoms in a quantity effective to cure the composition, and the catalyst. The amount of the polysiloxane fluid component is specifically greater than or equal to about 5, more specifically greater than or equal to about 7.5, and even more specifically greater than or equal to about 10 weight parts. Also desired is a polysiloxane fluid component of less than or equal to about 50 weight parts, more specifically less than or equal to about 25 weight parts, and more specifically less than or equal to about 20 weight parts of the combined amount of the polysiloxane having at least two alkenyl groups per molecule, the polysiloxane having at least two silicon-bonded hydrogen atoms in a quantity effective to cure the composition, and the catalyst.

The silicone foams can further optionally comprise a curable silicone gel formulation. Silicone gels are lightly cross-linked fluids or under-cured elastomers. They are unique in that they range from very soft and tacky to moderately soft and only slightly sticky to the touch. Use of a gel formulation decreases the viscosity of the composition, thereby allowing at least one of an increased filler loading, enhanced filler wetting, and/or enhanced filler distribution, thereby resulting in cured compositions having lower resistance and resistivity values and increased softness. Suitable gel formulations can be either two-part curable formulations or one-part formulations. The components of the two-part curable gel formulations is similar to that described above for LSR systems (i.e., an organopolysiloxane having at least two alkenyl groups per molecule and an organopolysiloxane having at least two silicon-bonded hydrogen atoms per molecule). The main difference lies in the fact that no filler is present, and that the molar ratio of the silicon-bonded hydrogen groups (Si—H) groups to the alkenyl groups is usually less than one, and can be varied to create a "under-cross linked" polymer with the looseness and softness of a cured gel. Specifically, the ratio of silicone-bonded hydrogen atoms to alkenyl groups is less than or equal to about 1.0, specifically less than or equal to about 0.75, more specifically less than or equal to about 0.6, and most specifically less than or equal to about 0.1. An example of a suitable two-part silicone gel formulation is SYLGARD® 527 gel commercially available from the Dow Corning Corporation.

The silicone foams can be cast and processed using only a bottom carrier, or both a bottom carrier and a top carrier as described above.

Use of magnetically aligned, electrically conductive particles allows the manufacture of polymer foams that have excellent electrical conductivity using lower levels of electrically conductive filler. Use of lower levels results in the foams having improved physical properties, particularly compression set and/or softness. These characteristics permit the polymer foams to be used as a variety of articles such as gasketing materials, electrical grounding pads, battery contact conductive spring elements and the like, particularly where electromagnetic and/or radio frequency shielding or electrostatic dissipative properties are desired. The materials can be used where sealing, shock absorption, and/or cushioning, together with electrical conductivity is desired. The foam layers could also be used to provide thermal conductivity, if the electrically conductive fillers are also thermally conductive, or if both electrically and thermally conductive fillers are present. In one embodiment, thermally conductive fillers (instead of electrically conductive fillers could be used, to provide a layer with thermal conductivity.

The electrically conductive foams could also be used with or without an electrically conductive layer (e.g., a copper foil) and a patterned, non-electrically conductive adhesive. As is known, non-electrically conductive adhesives are desirable due to their significantly lower cost compared to conductive adhesives. The foregoing article configuration allows an electrical connection between the foam layer and the conductive layer, together with use of a less expensive adhesive. In another embodiment, the formulation of the cured polymer foam is adjusted by known means to provide adhesive properties to the polymer foam. A conductive foam adhesive can be achieved.

Use of the magnetically aligned, electrically conductive particles enables the production of electrically conductive polymer foams having a volume resistivity of about $10^{-3}$ ohm-cm to about $10^3$ ohm-cm at 100 psi pressure. Within this range, the volume resistivity can be less than or equal to about $10^2$, more specifically less than or equal to about 10, and most specifically less than or equal to about 1 ohm-cm.

In an embodiment, the polymer foams provide electromagnetic shielding in an amount of greater than or equal to about 50 decibels (dB), specifically greater than or equal to about 70 dB, even more specifically greater than or equal to about 80 dB. One method of measuring electromagnetic shielding is set forth in MIL-G-83528B.

In a particular embodiment, the volume resistivity of the polymer foam is less than or equal to about 1, and the electromagnetic shielding is greater than or equal to about 80 dB.

In another embodiment, the foam also has at least one the following properties: a 25% compressive force deflection (CFD) of about 0.007 to about 10.5 kg/cm² (about 0.1 to about 150 psi); an elongation to break of greater than or equal to about 20%; a compression set (50%) of less than or equal to about 30%, and a bulk density of about 1 to about 125 pcf.

Modulus as reflected by compression force deflection (CFD) is determined on an Instron using 5×5 centimeter die-cut samples stacked to a minimum of 0.6 centimeters (0.250 inches), usually about 0.9 centimeters (0.375 inches), using two stacks per lot or run, and a 9090 kg (20,000 pound) cell mounted in the bottom of the Instron. CFD was measured by calculating the force in pounds per square inch (psi) required to compress the sample to 25% of the original thickness in accordance with ASTM D1056.

Tensile strength and elongation are measured using an Instron fitted with a 20 kilogram (50-pound) load cell and using 4.5-9.0 kilogram range depending on thickness and density. Tensile strength is calculated as the amount of force in kilogram per square centimeter (kg/cm²) at the break divided by the sample thickness and multiplied by two. Elongation is reported as percent extension.

It has been found that improved conductivity is achieved in blown foams when the average diameter of the cells in the foam is close to the thickness of the foam layer, i.e., when a single cell can span the distance between a first and an opposite second surface of the foam. Without being bound by theory it is believed that isolated and essentially continuous columns are more readily achieved when the cell diameter in the z-direction is close to the thickness of the foam. In one embodiment, each column consists of a single chain of particles that are mutually isolated from the other chains of particles. Good conductivity is achieved where each chain consists of 2 to 12, specifically 3 to 8 of the electrically conductive particles. The chains need not be strictly linear, but there is mutual contact between the particles of that establish an electrical path.

In order to provide good mechanical properties to the foam, particularly good sealing properties for a foamed sheet, the cellular diameter of the foam is about 20 to about 500 micrometers, preferably about 20 to about 300 micrometer. Optimal cellular diameters of the foam will therefore be a balance between the desired thickness of the foam sheet and the sealing ability desired.

The following examples, which are meant to be exemplary, not limiting, illustrate compositions and methods of manufacturing of some of the various embodiments of the electromagnetically shielding and/or electrostatically dissipative and/or electrically conductive polymer foams described herein.

EXAMPLES

The following test was used to determine conductivity. As is known, particular values for volume resistivity and electrostatic shielding will depend on the particular test methods and conditions. For example, it is known that volume resistivity and shielding effectiveness can vary with the pressure placed on the sample during the test. Useful electrical equipment and test fixtures to measure volume resistivity in the sample below are as follows. The fixture is a custom fabricated press with gold plated, 2.5 cm×2.5 cm (1 inch×1 inch) square, and electrical contacts. The fixture is equipped with a digital force gauge that allows the operator to control and make adjustments to the force that is applied to the surface of the sample. The power supply is capable of supplying 0 to 2 amps to the sample surface. The voltage drop and ohms across the sample are measured using a HP 34420A Nano Volt/Micro Ohmmeter. The electronic components of the fixture are allowed to warm up and, in the case of the HP 34420 A, the internal calibration checks are done. The samples are allowed to equilibrate, for a period of 24 hours, to the conditions of the test environment. Suitable test environment is 50% Relative Humidity (% RH) with a room temp of 23° C. (70° F.). The sample to be tested is placed between the platens of the test fixture and a load is applied to the surface. The applied load is dependent on the type of sample to be tested, soft foams are tested using small loads while solids are tested using a load range from about 63,279 to about 210,930 kilogram per square meter (90 to 300 pounds per square inch). Once the load has been applied, the current is applied to the sample and the voltage drop through the sample thickness is measured. A suitable test would include measurements at 4 different amp settings, 0.5, 1.0, 1.6, and 2.0 amps. For a conductive composite the resulting calculated volume resistivity for all four of the amp settings will be similar. The calculation for the volume resistivity is as follows:

$$\text{Volume resistivity (ohm-cm)} = (E/I)*(A/T)$$

wherein E=voltage drop (V), I=current (amps), A=area ($cm^2$), and T=thickness (cm).

Volume resistivity measurements are similarly made on elastomeric samples by cutting a rectangular sample, coating the ends with silver paint, permitting the paint to dry, and using a voltmeter to make resistance measurements.

Example 1

An evaluation of nickel and nickel-coated ceramic microspheres as conductive fillers in a silicone foam was performed. Silicones (Dow Corning Silicone 8137 and NUSIL 6033 from Nusil Technology LLC), the filler microspheres, and silicone cure inhibitor (1-octyn-3-ol from Aldrich Chemical Co.) were mixed in a Flaktek speed mixer, cast on a PET film with a controlled thickness, and were placed in an oven exposed to an adjustable magnetic field. In general, the chemically blown and cured foams had a thickness of 70 to 80 mils (1778 to 2032 micrometers).

The results in Table 1 show that even under a magnetic field as strong as 1200 Gauss, no conductivity was observed in the thick layers of the cured foam.

TABLE 1

| | Run No. | | | | | | |
|---|---|---|---|---|---|---|---|
| | 1 | 2 | 3 | 4 | 5 | 6 | 7 |
| Magnetic field, Gauss | 250 | 250 | 1000 | 1000 | 1200 | 1200 | 1200 |
| Casting thickness, mil | 10 | 20 | 20 | 20 | 20 | 20 | 20 |
| Oven temperature, ° C. | 23 | 23 | 23 | 23 | 23 | 23 | 23 |
| Oven residence time, min | 5 | 5 | 5 | 5 | 10 | 10 | 10 |
| Top carrier | no | no | no | no | no | no | no |
| Si formulation A/B, grams | 33/3.3 | 33/3.3 | 33/3.3 | 33/3.3 | 33/3.3 | 33/3.3 | 33/3.3 |
| Inhibitor, drops (about 40 mg) | 5 | 4 | 4 | 4 | 3 | — | 2 |
| Filler sphere size, micrometers | 45-75* | 45-75* | <35** | <35** | <100** | <100** | <100** |
| Wt. % Ni in filler | 100 | 100 | 27 | 27 | 10 | 10 | 10 |
| Filler loading, wt. % | 10 | 20 | 10 | 20 | 20 | 20 | 20 |
| Conductivity | no | no | no | no | no | no | no |

*100% nickel microspheres
**Ni-coated ceramic microspheres

Example 2

Table 2 shows the results of additional runs using 100% nickel microspheres. Formulations were cast at a thickness of 18 to 40 mil (457 to 1016 micrometers) to prepare foam samples.

TABLE 2

| | Run No. | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Magnetic field, Gauss | 1000 | 1000 | 1000 | 1000 | 1000 | 1000 | 1000 | 1000 | 1000 | 1000 | 1000 | 1000 | 1000 |
| Casting thickness, mil | 20 | 20 | 40 | 40 | 40 | 27 | 18 | 18 | 18 | 18 | 18 | 18 | 27 |
| Oven temp, ° C. | 60 | 60 | 60 | 60 | 60 | 60 | 60 | 60 | 60 | 60 | 60 | 60 | 60 |
| Oven residence time, min | 10 | 10 | 5 | 5 | 5 | 5 | 5 | 5 | 5 | 5 | 5 | 5 | 5 |
| With top carrier | no | no | no | yes | yes | yes | yes | yes | yes | yes | yes | yes | yes |
| Si formulation, A/B, grams | 33/3.3 | 33/3.3 | 33/3.3 | 33/3.3 | 33/3.3 | 33/3.3 | 33/3.3 | 33/3.3 | 50/5 | 50/5 | 33/3.3 | 33/3.3 | 33/3.3 |
| Inhibitor, drops (about 40 mg) | 4 | 4 | 4 | 4 | 4 | 4 | 4 | 4 | 6 | 6 | 4 | 4 | 4 |

TABLE 2-continued

| | Run No. | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Filler sphere size, micrometer | 45-75 | 45-75 | 45-75 | 45-75 | 45-75 | 45-75 | 45-75 | 45-75 | 45-75 | 45-75 | 32-45 | 32-45 | 32-45 |
| Filler loading, grams | 18 | 24 | 30 | 30 | 30 | 30 | 33 | 50 | 55 | 50 | 50 | 60 | 60 |
| Nickel column formation | yes | yes | yes | yes | yes | yes | yes | yes | yes | yes | yes | yes | yes |
| Thickness, mil | 21 | 23 | 55 | 103 | 125 | 98 | 49 | 46 | 46 | 47 | 47 | 41 | 72 |
| Density, PCF | 38.4 | 37.3 | 30.2 | 31 | 26.1 | 22 | 24.7 | 26.9 | 28.3 | 30.8 | 30.8 | 38.1 | 39.9 |
| Conductivity | no | no | no | no | no | no | no | no | no | no | no | no | no |
| Foam quality | poor | poor | poor | good | good | good | good | good | good | good | good | good | good |

Figure 6:
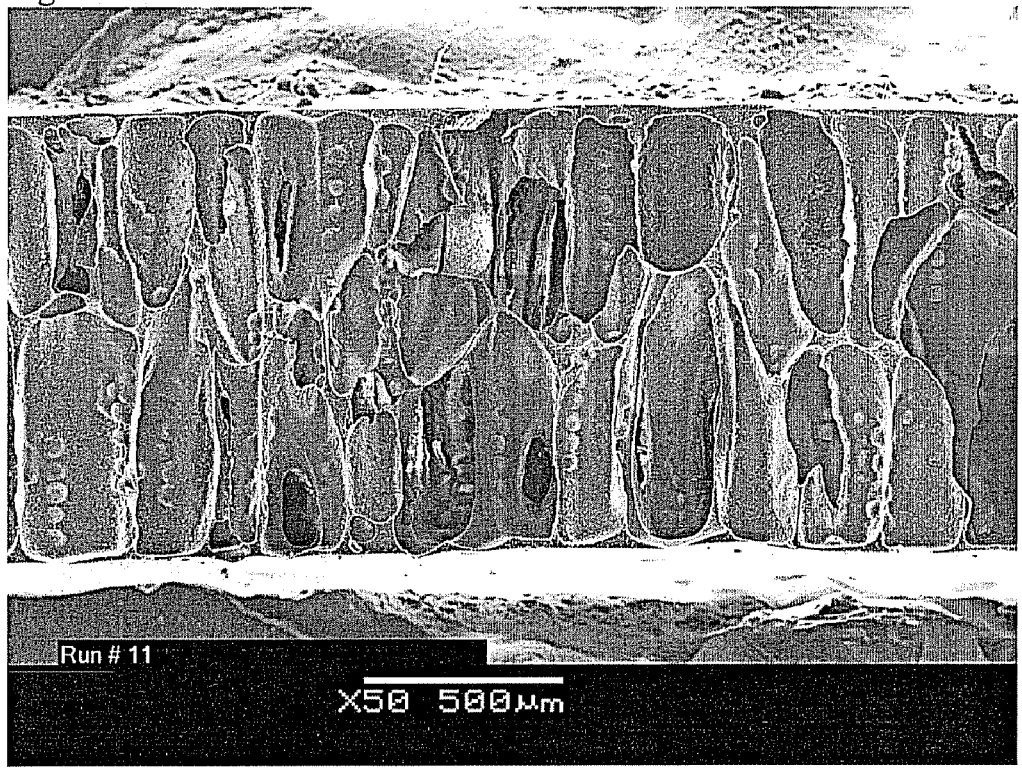
FIG. 6 is an SEM photograph of a foam where the thickness of the foam is greater than 1.5 times the average height of the cells.
Figure 7:
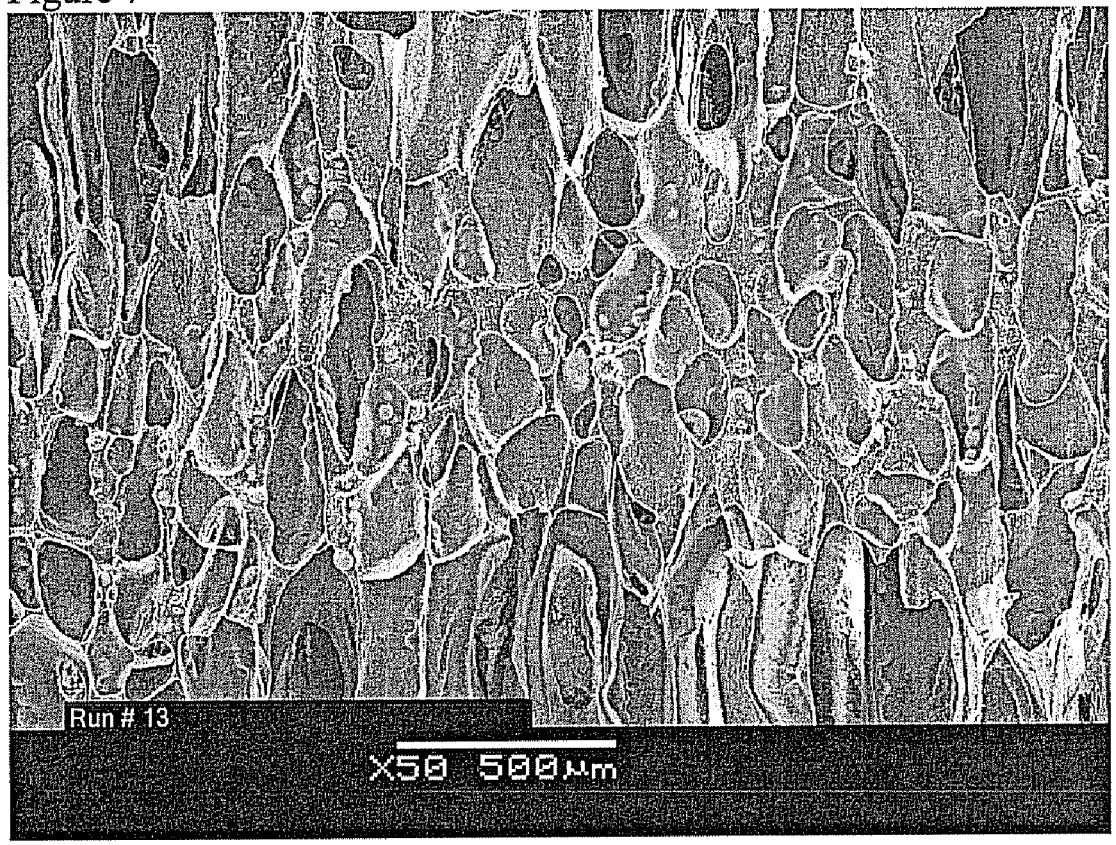
FIG. 7 is an SEM photograph of a foam where the thickness of the foam is greater than 1.5 times the average height of the cells.

In the runs shown in Table 2, filler column formation was observed; however the foams were not conductive. Runs 1-3 were cast without a top carrier, which resulted in foams of poorer quality. Analysis of runs 4-13 showed that the cured foams were 40 to 120 mils (1016 to 3038 micrometers) thick, and had two or more cells spanning the thickness of the foam (z-direction) FIG. 6 is an SEM of the foam of Run No. 11 of Example 3, and FIG. 7 is an SEM of the foam of Run No. 13 of Example 3. As can be seen from the SEM's, discontinuity was observed in individual nickel columns at the interface of the cells in the z-axis direction.

Example 3

Thinner foams were prepared using 100% Ni spheres or silver-coated nickel spheres, both with and without a top carrier as indicated. The premix was cooled in a refrigerator. The results are shown in Table 3A.

TABLE 3A

| | Run No. | | | | | | | |
|---|---|---|---|---|---|---|---|---|
| | 1a | 1b | 2a | 2b | 3a | 3b | 4a | 4b |
| Magnetic field, Gauss | 500 | 500 | 250 | 250 | 250 | 250 | 250 | 250 |
| Casting thickness, mil | 5 | 5 | 5 | 5 | 5 | 5 | 10 | 10 |
| Oven temp, ° C. | 55 | 55 | 55 | 55 | 50 | 50 | 50 | 50 |
| Oven residence time, min | 5 | 5 | 5 | 5 | 5 | 5 | 5 | 5 |
| With top carrier | no | yes | no | yes | no | yes | no | yes |
| Substrate | PET | PET | PET | PET | PET | PET | PET | PET |
| Si formulation A/B, grams | 33/3.3 | 33/3.3 | 33/3.3 | 33/3.3 | 33/3.3 | 33/3.3 | 33/3.3 | 33/3.3 |
| Inhibitor, drops (about 40 mg) | 4 | 4 | 4 | 4 | 4 | 4 | 4 | 4 |
| Filler sphere size, micrometer | 45-75 | 45-75 | 45-75 | 45-75 | 45-75 | 45-75 | 75-90* | 75-90* |
| Filler loading, grams | 48 | 48 | 48 | 48 | 48 | 48 | 48 | 48 |
| Filler column formation | yes | yes | yes | yes | yes | yes | yes | yes |
| Thickness, mil | 8 | 13 | 6 | 13.5 | 6 | 14 | 6 | 14 |
| Density, PCF | 72.3 | 35.4 | 97.7 | 34.2 | 102.5 | 34 | 93.5 | 35 |
| Conductivity | no | yes | no | yes | n/t | n/t | yes | yes |

*Silver-coated nickel spheres
n/t: not tested

As can be seen from the results in Table 3A, nickel column formation was observed in all runs. The cured foams had a thickness approximately equal that of a single cell in the foam (10 to 15 mils (254 to 381 micrometers)). Foams having a thickness approximating the diameter of the cells across the thickness of the foam (the z-direction) were conductive. The combination of thinner foams and use of a top carrier consistently resulted in conductive foams of good quality.

Results of resistivity testing for Runs 1b, 2b, and 4b of Table 3A are shown in Table 3B.

TABLE 3B

| | Nickel spheres | | Foam | | Volume resistivity, ohm-cm | | |
|---|---|---|---|---|---|---|---|
| Run | Size, μm | Volume % | Thickness, mil | Density, pcf | 100 psi | 200 psi | 400 psi |
| 1b | 45-75 | 13 | 8 | 35 | 1.02 | 0.35 | 0.15 |
| 2b | 45-75 | 13 | 14 | 34 | 9.44 | 0.67 | 0.23 |
| 4b | 75-90* | 13 | 6 | 35 | 0.04 | 0.01 | 0.01 |

*Silver-coated Ni spheres

Good conductivity was observed for all three runs. Run 1b and 4b displayed particularly good volume resistivity.

Example 4

Based on the results observed for Example 3, an additional set of foams were formulated and tested as shown in Table 4A. The filler consisted of 100% Ni microspheres or silver-coated nickel spheres A PET top carrier was used in all of the runs. Further in all of the runs, the premix was cooled in a refrigerator.

FIG. 2 is an SEM of the foam of Run No. 1 of Table 4A. FIG. 3 is an SEM of the foam of Run No. 5 of Table 4A. As can be seen from the SEM's, the thickness of the layer along the z-axis is within 1.0 to 1.5 times the average height of the cells. Columns of particles can be partially observed in both FIGS. 2 and 3.

The volume resistivities and other properties of Runs 4-8 of Table 4A are further illustrated in Table 4B.

TABLE 4B

| | Nickel spheres | | Foam | | | | | | |
|---|---|---|---|---|---|---|---|---|---|
| | | | Thickness, | Density, | CFD, | C-set, | Volume resistivity, ohm-cm | | |
| Run | Size, μm | Volume % | mil | pcf | psi | % | 100 psi | 200 psi | 400 psi |
| 4 | 45-75 | 8 | 23 | 24 | n/t | n/t | 16.6 | 7.7 | 1.1 |
| 5 | 45-75 | 13 | 24 | 32 | n/t | n/t | 17.2 | 3.1 | 1.4 |
| 6 | 75-150 | 8 | 32 | 24 | 1.0 | 2.8 | 1.3 | 0.1 | 0.04 |
| 7 | 75-150 | 13 | 31 | 31 | 3.9 | 1.7 | 4.6 | 0.2 | 0.05 |
| 8 | 75-90* | 8 | 28 | 24 | n/t | n/t | 1.5 | 0.6 | 0.2 |

*Silver coated nickel microspheres
CFD at 25%
C-set at 100° C.

Table 4B shows that the foams have good conductivity values at 100, 200, and 400 psi (689, 1379, and 2758 kilopascals, respectively). For example, a volume resistivity of

TABLE 4A

| | Run No. | | | | | | | | | |
|---|---|---|---|---|---|---|---|---|---|---|
| | 1 | 2 | 3 | 4 | 5 | 6 | 7 | 8 | 9 | 10 |
| Magnetic field, Gauss | 250 | 250 | 250 | 250 | 250 | 250 | 250 | 250 | 250 | 250 |
| Casting thickness, mil | 8 | 8 | 8 | 8 | 8 | 8 | 8 | 8 | 8 | 8 |
| Oven temp, ° C. | 70 | 70 | 70 | 70 | 70 | 70 | 70 | 70 | 70 | 70 |
| Oven residence time, min | 5 | 4 | 4 | 4 | 4 | 4 | 4 | 4 | 4 | 4 |
| Si formulation A/B, grams | 32/4 | 32/4 | 32/4 | 32/4 | 32/4 | 32/4 | 32/4 | 32/4 | 32/4 | 32/4 |
| Inhibitor, drops (about 40 mg) | 5 | 5 | 5 | 5 | 5 | 5 | 5 | 5 | 5 | 5 |
| Filler diameter, micrometers | 75-150 | 75-150 | 75-150 | 45-75 | 45-75 | 75-150 | 75-150 | 75-90* | 75-150 | 75-150 |
| Filler loading, grams | 48 | 28 | 48 | 28 | 48 | 28 | 48 | 28 | 28 | 48 |
| Filler loading, vol % | 13 | 8 | 13 | 8 | 13 | 8 | 13 | 8 | 8 | 13 |
| Ratio of foam thickness to average cell height | 1-1.5 | 1 | 1 | 1 | 1 | 1 | 1 | 1 | 1 | 1 |
| Foam thickness, mil | 39 | 33 | 34 | 25 | 25 | 32 | 31 | 28 | 29 | 30 |
| Foam density, PCF | 29 | 22.3 | 29.8 | 22.9 | 31.7 | 23.5 | 30.5 | 23.9 | 24.9 | 32.6 |
| Conductivity | yes | yes | yes | yes | yes | yes | yes | yes | yes | yes |

*silver-coated nickel spheres 1.3 and 0.04 ohm-centimeter at 100 and 400 psi respectively, with 8 volume percent filler (44 weight percent) for trial 9. The foams possessed other favorable properties such as softness (CFD of 1-4 psi (700-2,800 kg/m2) at 25%, low C-set of 2-3% at 100° C., and low density (20-35 pcf).

Example 5

Thicker foams (25-40 mils) were also prepared as shown in Table 5. The filler used was either 100% nickel spheres or nickel-coated steel spheres, and was generally of larger size (75-150 micrometers, 100-150 micrometers, 150-177 micrometers, or 177-200 micrometers). The filler loadings were at 8, 12, and 14 (I don't see any 13% level examples in that table) volume percent. The formulations were cast to a thickness of 7 mils onto a first PET release layer, and a PET top carrier layer was placed on the. They were exposed to a magnetic field of the indicated intensity and duration, while foamed and cured at 70° C. as shown in Table 5.

The results in Table 5 show that good conductivity was observed. The foams produced have good foam quality and conductivity.

The terms "first," "second," and the like as used herein do not denote any order, quantity, or importance, but rather are used to distinguish one element from another. The terms "a" and "an" do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). All ranges disclosed within this specification are inclusive of the stated endpoint, and are independently combinable. All references are incorporated herein by reference in their entirety.

While the invention has been described with reference to exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention.

TABLE 5

| | \multicolumn{9}{c}{Run #} | | | | | | | | |
|---|---|---|---|---|---|---|---|---|---|
| | R1 | R2 | R3 | R4 | R5 | R6 | R7 | R8 | R9 |
| Magnetic field, gauss | 750 | 750 | 750 | 750 | 750 | 750 | 1000 | 1000 | 1000 |
| Magnetic field duration, min | 1 | 1 | 1 | 1 | 1 | 2 | 2 | 2 | 2 |
| Oven temperature, °C. | 70 | 70 | 70 | 70 | 70 | 70 | 70 | 70 | 70 |
| Oven residence time, min | 4 | 4 | 4 | 4 | 4 | 4 | 4 | 4 | 4 |
| Coating thickness, mil | 7 | 7 | 7 | 7 | 7 | 7 | 7 | 7 | 7 |
| 8137A/B, 8/1 | 48/6 | 48/6 | 48/6 | 48/6 | 48/6 | 48/6 | 48/6 | 48/6 | 48/6 |
| Inhibitor*, ppm | 350 | 1000 | 1500 | 1000 | 1500 | 2000 | 1500 | 2000 | 1500 |
| Ni sphere, micrometers | 75-150 | 75-150 | 75-150 | 75-150 | 75-150 | 75-150 | — | — | — |
| Ni-coated steel, micrometers | — | — | — | — | — | — | 177-200 | 177-200 | 177-200 |
| Filler loading, grams | 42 | 42 | 42 | 64 | 64 | 64 | 60 | 60 | 72 |
| Filler, vol % | 8 | 8 | 8 | 12 | 12 | 12 | 12 | 12 | 14 |
| Foam thickness, mil | 28 | 29 | 31 | 35 | 35 | 34 | 37 | 36 | 37 |
| Volume resistivity, ohm-cm | | | | | | | | | |
| at 100 psi | 0.9 | 0.8 | 0.8 | 1.0 | 1.0 | 1.3 | 0.6 | 1.1 | 1.4 |
| at 200 psi | 0.4 | 0.4 | 0.4 | 0.4 | 0.4 | 0.4 | 0.2 | 0.3 | 0.3 |
| at 400 psi | 0.2 | 0.2 | 0.2 | 0.1 | 0.1 | 0.2 | 0.1 | 0.1 | 0.1 |

| | \multicolumn{9}{c}{Run #} | | | | | | | | |
|---|---|---|---|---|---|---|---|---|---|
| | R10 | R11 | R12 | R13 | R14 | R15 | R16 | R17 | R18 |
| Magnetic field, gauss | 1000 | 1000 | 1000 | 1000 | 1000 | 1000 | 1000 | 1000 | 1000 |
| Magnetic field duration, min | 2 | 2 | 2 | 2 | 2 | 2 | 2 | 2 | 2 |
| Oven temperature, °C. | 70 | 70 | 70 | 70 | 70 | 70 | 70 | 70 | 70 |
| Oven residence time, min | 4 | 4 | 4 | 4 | 4 | 4 | 4 | 4 | 4 |
| Coating thickness, mil | 7 | 7 | 7 | 7 | 7 | 7 | 7 | 7 | 7 |
| 8137A/B, 8/1 | 48/6 | 48/6 | 48/6 | 48/6 | 48/6 | 48/6 | 48/6 | 48/6 | 48/6 |
| Inhibitor*, ppm | 2000 | 1000 | 1500 | 1000 | 1500 | 1500 | 2000 | 1500 | 2000 |
| Ni sphere, micrometers | — | — | — | — | — | — | — | — | — |
| Ni-coated steel, micrometers | 177-200 | 150-177 | 150-177 | 150-177 | 150-177 | 100-150 | 100-150 | 100-150 | 100-150 |
| Filler loading, grams | 72 | 60 | 60 | 72 | 72 | 72 | 72 | 60 | 60 |
| Filler, vol % | 14 | 12 | 12 | 14 | 14 | 14 | 14 | 12 | 12 |
| Foam thickness, mil | 39 | 33 | 34 | 34 | 35 | 35 | 27 | 34 | 34 |
| Volume resistivity, ohm-cm | | | | | | | | | |
| at 100 psi | 1.7 | 0.6 | 0.8 | 0.7 | 1.4 | 1.1 | 10.9 | 1.5 | 1.7 |
| at 200 psi | 0.4 | 0.2 | 0.3 | 0.3 | 0.3 | 0.4 | 1.2 | 0.6 | 0.8 |
| at 400 psi | 0.1 | 0.1 | 0.1 | 0.1 | 0.1 | 0.2 | 0.4 | 0.2 | 0.2 |

*1-octyn-3-ol

What is claimed is:

1. A polymer foam layer comprising
a first surface and an opposite second surface;
a plurality of foam cells between the first surface and the opposite second surface of the polymer foam layer, wherein the thickness of the polymer foam layer between the first surface and the opposite second surface is 1.0 to 1.5 times the average diameter, in a thickness direction, of the plurality of foam cells; and
a plurality of magnetic, electrically conductive particles aligned into mutually isolated chains that essentially continuously span the foam between the first surface and the opposite second surface of the polymer foam layer.

2. The layer of claim 1, wherein the particles are formed from a material that is both magnetic and electrically conductive.

3. The layer of claim 1, wherein the magnetic, electrically conductive particles comprise nickel, silver, gold, copper, aluminum, cobalt, iron, or a combination thereof.

4. The layer of claim 1, wherein the particles comprise nickel, silver, or a combination of nickel and silver.

5. The layer of claim 1, wherein the particles comprise nickel-coated iron particles, silver-coated nickel particles, or a combination thereof.

6. The layer of claim 1, comprising 2 to 30 volume percent of the magnetic, electrically conductive particles.

7. The layer of claim 1, wherein the magnetic, electrically conductive particles have an average diameter of 20 to 300 micrometers.

8. The layer of claim 1, wherein the chains are essentially perpendicular to the first surface and the second surfaces of the polymer foam layer.

9. The layer of claim 1, wherein the chains are at an angle of about 5 to about 45 degrees relative to an axis perpendicular to the first and second surfaces of the polymer layer.

10. The layer of claim 1, wherein the particles do not protrude from the surfaces of the polymer foam.

11. The layer of claim 1, wherein the polymer foam is a polyurethane foam, a silicon foam, or a combination thereof.

12. The layer of claim 1, wherein the polymer foam layer had an electromagnetic shielding capacity of greater than or equal to about 50 dB.

13. The layer of claim 1, wherein the polymer foam layer has a volume resistivity of about $10^{-3}$ ohm-cm to about $10^3$ ohm-cm at a pressure of 689 kilopascals.

14. The layer of claim 1, wherein the polymer foam layer has a compression force deflection value of about 70 to about 10,500 kilograms per square meter at 25% deflection, measured in accordance with ASTM 1056.

15. The layer of claim 1, wherein the foam is chemically and/or physically blown.

16. The layer of claim 1, wherein the thickness of the polymer foam layer between the first surface and the opposite second surface is 1.0 to 1.3 times the average diameter, in the thickness direction, of the plurality of foam cells.

17. The layer of claim 1, wherein each column consists of an isolated chain of 2 to 12 electrically conductive particles.

18. The layer of claim 1, each column consists of an isolated chain of 3 to 8 electrically conductive particles.

19. An article comprising the foam layer of claim 1.

20. The article of claim 19, in the form of a gasket for electromagnetic shielding, a grounding pad, or a battery contact conductive spring element.

21. A method of manufacturing a polymer foam layer, the method comprising:
   forming a layer having a first surface and an opposite second surface, the layer comprising
      a polymer foam precursor composition; and
      a filler composition comprising a plurality of magnetic, electrically conductive particles; and
   foaming the foam precursor composition to form a plurality of foam cells in the layer;
   applying to the layer a magnetic field of a strength and for a time effective to align the magnetic, electrically conductive particles into mutually isolated chains that essentially continuously span the foam between the first surface and the opposite second surface of the layer; and
   curing the foamed layer, wherein the thickness of the cured layer is 1.0 to 1.5 times an average diameter, in a thickness direction, of the plurality of foam cells in the cured layer.

22. The method of claim 21, wherein the applied magnetic flux density is about 100 to about 1500 Gauss.

23. The method of claim 21, wherein the magnetic field is applied prior to curing the composition.

24. The method of claim 21, wherein the magnetic field is applied during foaming of the composition.

25. The method of claim 21, wherein forming the layer comprises casting the layer onto a first carrier substrate.

26. The method of claim 25, further comprising disposing a second carrier substrate on a side of the layer opposite the first carrier substrate.

27. A method of manufacturing a silicon foam comprising:
   extruding a mixture comprising a polysiloxane polymer having hydride substituents, a blowing agent, a platinum based catalyst, and a filler composition comprising a plurality of magnetic, electrically conductive particles; and
   blowing and curing the mixture in an applied magnetic field to align the magnetic, electrically conductive particles into mutually isolated chains that essentially continuously span the foam between a first surface and a second opposite surface of the foam, wherein the thickness of the foam is 1.0 to 1.5 times an average diameter, in a thickness direction, of the plurality of foam cells in the cured layer.

28. A method of manufacturing a polymer foam comprising:
   metering and/or casting a composition comprising a polysiloxane polymer having hydride substituents, a blowing agent, a platinum based catalyst, and a plurality of magnetic, electrically conductive particles into a mold or a continuous coating line;
   foaming the composition to provide a foam having a first surface and an opposite second surface; and
   exposing the foam to a magnetic field to align the magnetic, electrically conductive particles into mutually isolated chains that essentially continuously span the foam between the first surface and the second surface of the foam, wherein the thickness of the foam is 1.0 to 1.5 times an average diameter, in a thickness direction, of the plurality of foam cells in the cured layer.

* * * * *